(12) United States Patent
Petrmichl et al.

(10) Patent No.: US 9,388,628 B2
(45) Date of Patent: Jul. 12, 2016

(54) VACUUM INSULATED GLASS (VIG) WINDOW UNIT WITH GETTER STRUCTURE AND METHOD OF MAKING SAME

(75) Inventors: Rudolph H. Petrmichl, Ann Arbor, MI (US); John P. Hogan, Dearborn, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 1012 days.

(21) Appl. No.: 13/562,386

(22) Filed: Jul. 31, 2012

(65) Prior Publication Data
US 2014/0037869 A1   Feb. 6, 2014

(51) Int. Cl.
*E06B 3/66* (2006.01)
*E06B 3/677* (2006.01)

(52) U.S. Cl.
CPC ............ *E06B 3/6612* (2013.01); *E06B 3/6775* (2013.01); *Y02B 80/24* (2013.01)

(58) Field of Classification Search
CPC ...... E06B 3/6612; Y02B 80/20; Y02B 80/22; Y02B 80/24
See application file for complete search history.

(56) References Cited

U.S. PATENT DOCUMENTS

| | | | |
|---|---|---|---|
| 4,430,537 A * | 2/1984 | Sauer | H01H 1/645 200/302.1 |
| 6,422,824 B1 | 7/2002 | Lee et al. | |
| 6,514,430 B1 | 2/2003 | Corazza et al. | |
| 6,558,494 B1 | 5/2003 | Wang et al. | |
| 6,692,600 B2 | 2/2004 | Veerasamy et al. | |
| 7,115,308 B2 * | 10/2006 | Amari | C03C 27/06 156/104 |
| 8,137,494 B2 | 3/2012 | Cooper et al. | |
| 8,227,055 B2 | 7/2012 | Wang | |
| 2003/0001499 A1 | 1/2003 | Kim | |
| 2003/0051436 A1 | 3/2003 | Veerasamy et al. | |
| 2004/0104675 A1 | 6/2004 | Martelli et al. | |
| 2004/0253395 A1 | 12/2004 | Amari et al. | |
| 2005/0243451 A1 * | 11/2005 | Wu | E06B 3/6612 359/883 |
| 2011/0234091 A1 | 9/2011 | Yoshitake et al. | |

FOREIGN PATENT DOCUMENTS

| | | |
|---|---|---|
| EP | 0 757 920 | 2/1997 |
| EP | 1 439 152 | 7/2004 |
| JP | 7-140906 | * 6/1995 |
| JP | 2004-149343 | 5/2004 |
| JP | 2004-152530 | 5/2004 |
| WO | WO 97/29503 | 8/1997 |
| WO | WO 01/12942 | 2/2001 |
| WO | WO 2004/039741 | 5/2004 |
| WO | WO 2004/039742 | 5/2004 |

OTHER PUBLICATIONS

U.S. Appl. No. 13/562,408, filed Jul. 31, 2012; Petrmichl et al.
U.S. Appl. No. 13/562,423, filed Jul. 31, 2012; Petrmichl et al.

\* cited by examiner

*Primary Examiner* — Donald J Loney
(74) *Attorney, Agent, or Firm* — Nixon & Vanderhye P.C.

(57) ABSTRACT

Vacuum insulated glass (VIG) window unit configurations with getter structures are provided, as are methods for making the same. Techniques are provided for optimizing (e.g., increasing) the surface area of active getter material, before and/or after activation/flashing, within the constraints of a VIG window unit.

27 Claims, 13 Drawing Sheets

VACUUM INSULATED GLASS (VIG) WINDOW UNIT WITH GETTER STRUCTURE AND METHOD OF MAKING SAME

This disclosure relates generally to vacuum insulated glass (VIG) window unit configurations and methods for making VIG window units. The disclosure more particularly relates to getter structures for use in VIG window units, and methods of making the same. Getters are typically subdivided into two main classes: evaporable getters (EGs) and non-evaporable getters (NEGs).

BACKGROUND AND SUMMARY OF EXAMPLE EMBODIMENTS

Vacuum insulating glass (VIG) window units typically include at least two spaced apart glass substrates that enclose an evacuated or low-pressure space/cavity therebetween. The substrates are interconnected by a peripheral edge seal and typically include spacers between the glass substrates to maintain spacing between the glass substrates and to avoid collapse of the glass substrates that may be caused due to the low pressure environment that exists between the substrates. Some example VIG configurations are disclosed, for example, in U.S. Pat. Nos. 5,657,607, 5,664,395, 5,657,607, 5,902,652, 6,506,472 and 6,383,580 the disclosures of which are all hereby incorporated by reference herein in their entireties.

FIGS. 1 and 2 illustrate a conventional VIG window unit 1 and elements that form the VIG window unit 1. For example, VIG unit 1 may include two spaced apart substantially parallel glass substrates 2, 3, which enclose an evacuated low-pressure space/cavity 6 therebetween. Glass sheets or substrates 2,3 are interconnected by a peripheral edge seal 4 which may be made of fused solder glass, for example. An array of support pillars/spacers 5 may be included between the glass substrates 2, 3 to maintain the spacing of glass substrates 2, 3 of the VIG unit 1 in view of the low-pressure space/gap 6 present between the substrates 2, 3.

A pump-out tube 8 may be hermetically sealed by, for example, solder glass 9 to an aperture/hole 10 that passes from an interior surface of one of the glass substrates 2 to the bottom of an optional recess 11 in the exterior surface of the glass substrate 2, or optionally to the exterior surface of the glass substrate 2. A vacuum is attached to pump-out tube 8 to evacuate the interior cavity 6 to a low pressure that is less than atmospheric pressure. After evacuation of the cavity 6, a portion (e.g., the tip) of the tube 8 is melted to seal the vacuum in low pressure cavity/space 6. The optional recess 11 may retain the sealed pump-out tube 8.

As shown in FIGS. 1-2, a getter 12 may be included within a recess 13 that is disposed in an interior face of one of the glass substrates, e.g., glass substrate 2. The getter 12 may be used to absorb or bind with certain residual impurities that may remain after the cavity 6 is evacuated and sealed. The getter is of or includes a mixture of metals that can react with gas(es) to hold gas(es) impurities to the gettering surface and/or dissolve such gas(es).

Disclosed herein are techniques for optimizing (e.g., increasing) the surface area of active getter within the constraints of a VIG window unit.

In certain example embodiments of this invention, there is provided a vacuum insulated glass (VIG) window unit comprising: first and second substantially parallel glass substrates, a plurality of spacers and a seal provided between the first and second substrates, a space, defined at least by the seal, located between the first and second substrates and being at a pressure less than atmospheric pressure, a getter recess defined in the first substrate for receiving an originally positioned getter, and a getter structure on the second substrate, located substantially opposite the getter recess in the first substrate, designed so that more getter material surface area is provided on the second substrate after getter activation. The getter structure on the second substrate may comprise a recess defined in the second substrate in certain example embodiments.

In certain example embodiments of this invention, there is provided a vacuum insulated glass (VIG) window unit comprising: first and second substantially parallel substrates, a plurality of spacers and a seal provided between the first and second substrates, a space, defined at least by the seal, located between the first and second substrates and being at a pressure less than atmospheric pressure, a first getter recess defined in the first substrate for receiving an originally positioned evaporable getter (EG), a second getter recess defined in the second substrate in a position substantially opposite the first getter recess so that at least a portion of the first getter recess in the first substrate overlaps with at least a portion of the second getter recess in the second substrate, and wherein evaporated and deposited getter material, from the EG, is located in both the first getter recess and the second getter recess.

In certain example embodiments of this invention, the surface of the substrate receiving the getter deposit (e.g., EG type getter), and/or a surface opposing the original getter deposit across the low pressure cavity, may be contoured so as to increase the area of the active gettering surface in the confined VIG space housing the getter. This increasing of gettering surface area at least following activation of the EG may be achieved by one or more of (i) rounding and/or chamfering edge(s) of the cut/recess in the smooth glass substrate where the EG is located so as to increase the scattering of getter material upon activation so that the EG is flashed over a larger area when activated, (ii) contouring the substrate surface receiving an EG deposit so as to increase the area of the active surface in the confined space housing the getter, (iii) roughening the area of the otherwise substantially smooth glass substrate receiving an EG deposit, such as via sandblasting, etching and/or grinding, so as to enable an increase in gettering material surface area, (iv) pre-depositing in the area to receive an EG deposit a rough (e.g., nodular) and/or porous coating, such as via sol gel or selected frit application, in order to promote porosity in the getter deposit which increases the getter's sorption capacity, (v) using EG material that is provided in a getter container that is shaped with at least one open area(s) to optimize scattering and/or evaporation direction(s) of gettering material upon activation/flashing, and/or (vi) providing any suitable recess and/or roughened coating on the substrate opposite the original getter location so as to be across the low pressure cavity from the original getter location so as to increase the area of active gettering surface on the opposite substrate following EG activation/flashing. Any or the above embodiments/features (i), (ii), (iii), (iv), (v) and/or (vi) may or may not be used in combination with any of the other embodiments/features (i), (ii), (iii), (iv), (v) and (vi) in different embodiments of this invention. For example, embodiment/feature (i) may or may not be used in combination with any of (ii)-(vi) in different embodiments of this invention. Thus, the getter recess and/or a getter container in the getter recess is/are shaped to increase evaporated getter material surface area, with evaporated getter material being the getter material that is present after activation and/or flashing of a getter that included EG type material.

These and other embodiments and advantages are described herein with respect to certain example embodiments and with reference to the following drawings in which like reference numerals refer to like elements throughout the several views, and wherein:

DETAILED DESCRIPTION OF EXAMPLE EMBODIMENTS

Figure 2:
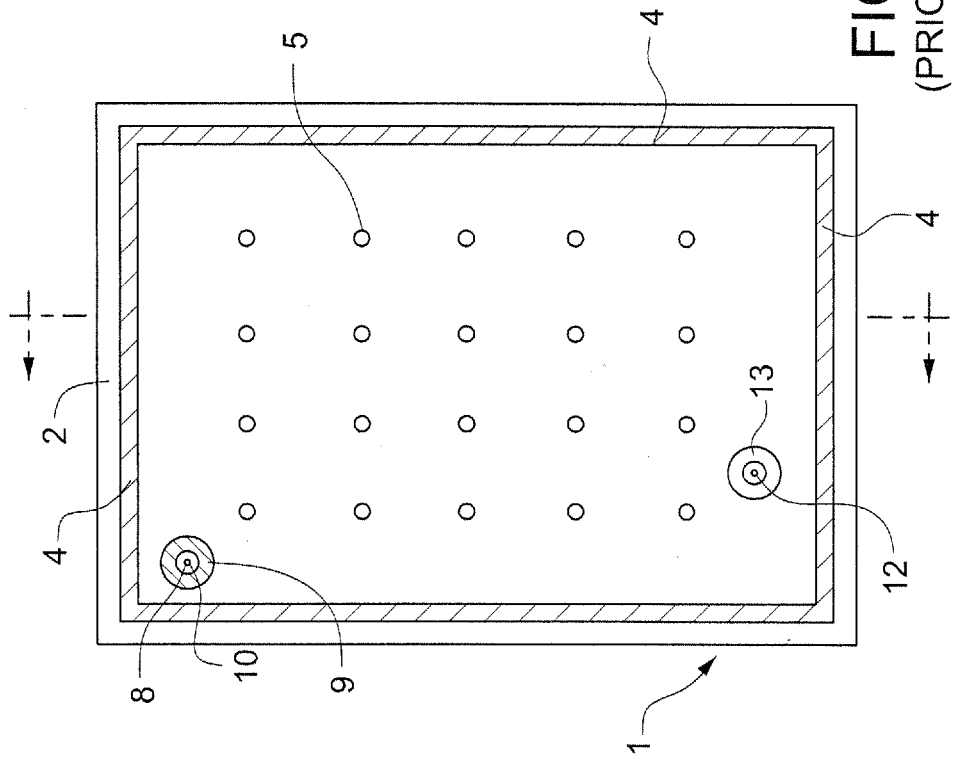
FIG. 2 is a top plan view of the conventional VIG unit of FIG. 1.
Figure 1:
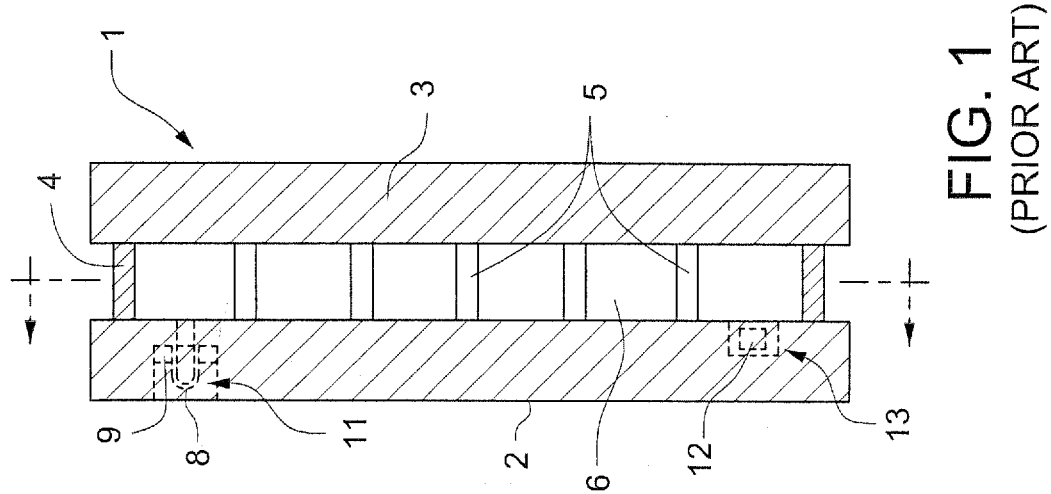
FIG. 1 is a cross sectional schematic diagram of a conventional VIG unit.

Certain example embodiments will be described in detail herein with reference to the foregoing drawings in which like reference numerals refer to like elements throughout the several views. It will be understood that the embodiments described herein are intended to be illustrative, not limiting, and that those skilled in the art will understand that various modifications may be made without departing from the true spirit and full scope of the claims appended hereto.

With reference to FIGS. 3 and 5-15, a schematic cross sectional view of an example VIG window unit 1 is illustrated. VIG window units 1 may be used, for example, and without limitation, as windows in residential homes, office buildings, apartment buildings, doors, and/or the like. The VIG window unit 1 includes spaced apart first and second transparent glass substrates 2, 3 that may be interconnected by an edge seal 4, which may, for example, and without limitation, be of or include a vanadium based or VBZ type seal or a solder glass type seal. Example vanadium based or VBZ type seal compositions are disclosed in U.S. patent application Ser. No. 13/354,963, filed Jan. 20, 2012, the disclosure of which is incorporated by reference herein in its entirety. VBZ (e.g., vanadium, barium, zinc) based seal compositions are discussed in Ser. No. 13/354,963, and may be used for the edge seal 4 and/or frit based tube seal 9 in certain example embodiments. Conventional solder glass frit material may also be used for the hermetic edge seal 4 and/or the frit based tube seal 9 in certain example embodiments. When using VBZ type seal compositions, a lower temperature sealing thermal profile is used to maintain the desired temper of the glass of the VIG unit because VBZ compositions have a lower firing temperature (e.g., <250° C.) than certain other conventional glass frit compositions that may be used to form seals in VIG units. It will be understood that the embodiments disclosed herein are equally applicable to VIG configurations using any suitable seal material.

In certain embodiments, the transparent glass substrates 2, 3 may be approximately the same size. However, in certain other example embodiments, one glass substrate 2 may be larger than the other 3 to provide, for example, an approximately L-shaped step proximate an edge of the VIG unit. One or both of the glass substrates 2, 3 may also optionally include at least one coating material (not shown) such as, for example, and without limitation, a low-E coating. It will be understood that various coatings may be present on an interior surface of at least one of the glass substrates 2, 3, and that such coatings provide various beneficial performance characteristics to the VIG window unit 1. In certain example embodiments, a low-E coating for blocking IR radiation is provided on the interior surface of substrate 3 (as opposed to substrate 2 which supports the getter). In certain example embodiments, the VIG window unit has a visible transmission of at least about 30%, more preferably of at least about 40%, even more preferably of at least about 50%, and even more preferably of at least about 60% or 70%.

Still referring most particularly to FIGS. 3 and 5-15, an array of support pillars/spacers 5 is located between the glass substrates 2, 3 to maintain the spacing of the substrates in view of the lower than atmospheric pressure that is ultimately provided in low pressure cavity/space 6 between the substrates 2, 3. In certain example embodiments, the spacers may have a height, for example, of about 0.1 to 1.0 mm, more preferably from about 0.2 to 0.4 mm. The height of the spacers 5 may approximately define the height of the vacuum cavity 6. As noted above, the spacers 5 are preferably of a size that is sufficiently small so as to be visibly unobtrusive. According to certain example embodiments, the spacers 5 may be made of or include solder glass, glass, ceramic, metal, polymer, or any other suitable material. Additionally, the spacers 5 may be, for example, generally cylindrical, round, spherical, dime-shaped, C-shaped, pillow-shaped or any other suitable shape.

A pump-out tube 8 (see FIGS. 3, 10-12 and 15), that may be hermetically sealed for example using solder glass 9, is provided through a hole 22 in one of the glass substrates, e.g., substrate 3. The pump-out tube 8 is used in a process to evacuate the cavity 6 between the substrates 2, 3, such as, for example, by attaching a vacuum pump to the distal end of pump-out tube 8 and evacuating the cavity 6 to a low pressure, e.g., a pressure lower than atmospheric pressure. In a preferred example, a pressure in the cavity 6 is, for example, preferably below about $10^{-2}$ Torr, and more preferably below about $10^{-3}$ Torr, and even more preferably below about $5 \times 10^{-4}$ Torr. After evacuating the cavity 6, the pump-out tube 8 may be sealed, for example, by melting the tip 8a of the tube 8 by any suitable means, such as, for example, by laser. According to certain example embodiments, the pump-out tube 8 may or may not fully extend through the hole 22 to be flush with the interior surface 3a of the glass substrate 3, and may be left just short of the interior surface 3a by a distance of, for example, and without limitation, up to about up to 0.1 mm from the interior surface 3a in certain example embodiments.

In certain example embodiments of this invention (e.g., see FIGS. 5-15), there is provided a vacuum insulated glass (VIG) window unit comprising first and second substantially parallel glass substrates 2, 3, an array of spacers 5 and a seal 4 provided between the first and second substrates; a space 6, defined at least by the seal, located between the first and second substrates and being at a pressure less than atmospheric pressure, a getter recess 14 defined in substrate 2 for receiving an originally positioned getter; and a getter structure (e.g., 14', 15 and/or 36) on the second substrate 3 located substantially opposite the getter recess 14 and designed so that more getter material surface area is provided on the substrate 3 after getter activation. The getter structure on the substrate 3 may comprise a recess 14' defined in the substrate 3 (e.g., see FIGS. 5, 7-8, 10-11 and 13-15), and the recess 14' may comprise (i) a roughened surface 15 and/or 36 that is rougher than is a major interior surface 3a of the substrate 3, and/or (ii) a bottom surface and at least one sidewall that is at least partially angled relative to the vertical (e.g., see FIGS. 4a, 4d, 4f, and 4k). A pump-out tube 8 may be located directly over and/or in the recess 14' defined in the substrate 3 (e.g., see FIGS. 10-11 and 15).

The recess 14', roughness 15, coating 36, and/or contour/shape of recess 14 increase sorption capacity of the getter by increasing the area of the surface receiving the evaporation flux from the EG 32. The sorption capacity may be increased by increasing the porosity of the evaporated deposit by flashing the EG at reduced temperature (e.g., room temperature or cooler) in certain example embodiments, and/or by adding a small amount of gas (e.g., nitrogen gas) during activation that is later absorbed by the EG material. These procedures may be used in conjunction with the use of structures (e.g., 14', 36, 15) that increase getter material surface area. One or more getters may be provided in a given VIG unit according to different embodiments of this invention. And while example embodiments of this invention are preferably used in conjunction with EG type getters, this invention is not so limited and may also be used with NEG type getters. Roughened surface area (e.g., via rough glass 15 and/or coating 36) may increase gas flow to NEG surfaces in contact with glass leading to improved results in NEG embodiments. And in certain example embodiments, the getter 32 may be a hybrid getter including both EG and NEG material.

Referring to FIGS. 3 and 5-12, after the pillars/spacers 5 are positioned on bottom glass substrate 2, at least one getter (e.g., EG type) 32 is positioned in recess 14. Recess 14 (and recess 14' when present) may be of any suitable shape as viewed from above/below, including but not limited to square, rectangular, circular, oval, or triangular. Then, the edge seal material is deposited on substrate 2. The other substrate 3 is brought down on substrate 2 so as to sandwich spacers/pillars 5, the glass frit solution, and getter 32 between the two substrates 2, 3. The assembly including the glass substrates 2, 3, the spacers/pillars 5, getter 32, and the edge seal material is then heated to a temperature (e.g., of at least about 500° C.) at which point the edge seal material melts, wets the surfaces of the glass substrates 2, 3, and ultimately forms a hermetic peripheral/edge seal 4.

After formation of the edge seal 4 between the substrates, a vacuum is drawn via the pump-out tube 8 to form low pressure space/cavity 6 between the substrates 2, 3. The tube 8 may be above the getter (e.g., see FIGS. 3, 10-12 and 15), but in other embodiments such as FIGS. 5-6 the tube 8 may be distant from the getter material 32. To maintain the low pressure in the space/cavity 6, substrates 2, 3 are hermetically sealed via edge seal 4, and the small spacers/pillars 5 are provided between the substrates to maintain separation of the approximately parallel substrates against atmospheric pressure. Once the space 6 between substrates 2, 3 is evacuated, the pump-out tube 8 may be sealed, for example, by melting its tip using a laser or the like. After evacuation of the cavity/space 6 to a pressure less than atmospheric, sealing of the pump-out tube may be accomplished by heating an end 8a of the pump-out tube 8 to melt the opening and thus seal the cavity of the VIG window unit. For example and without limitation, this heating and melting may be accomplished by laser irradiation of the tip 8a of the pump-out tube 8.

In various embodiments herein, the substrates 2 and/or 3 of or including glass may be from about 1-6 mm thick, more preferably from about 3-5 mm thick, with an example glass thickness being about 4 mm. In various embodiments herein, recess 14 and/or recess 14' may have a depth of from about 1.5 to 2.5 mm, with an example recess depth being about 2 mm in an example 4 mm thick sheet of glass. In certain example embodiments of forming the substrates 2 and 3, the getter recess(es) 14 and/or 14' are formed in respective glass sheets, then the glass sheets may optionally be thermally tempered, then optionally a low-E coating may be provided on an interior surface of one of the substrates, then the two substrates 2, 3 (including any low-E coating, not shown) may be brought together around edge seal material and spacers as discussed herein during the VIG formation process.

Getter 32 absorbs and/or binds with certain residual impurities (e.g., undesirable gases such as $CO_2$ and $N_2$) that may remain and/or are present in the cavity 6 after evacuation and sealing of the pump-out tube. Getter 32 in FIGS. 3, 5-15 is illustrated as-deposited, in non-activated form. Any getter 32 illustrated in any embodiment (e.g., in any of FIGS. 3 and 5-15) may be either provided in a container/trough (e.g., which may be metallic) of any suitable shape, or alternatively may be deposited on the substrate 2 without being housed in a container/trough. A container/trough for holding the getter material 32 is sometimes advantageous for inducting heating/activation of the getter, and such getter containers may be of any suitable shape including but not limited to cylindrical or annular in shape. Getters are typically subdivided into two main classes: evaporable getters (EGs) and non-evaporable getters (NEGs). EGs often include one or more alkaline earth metal(s) calcium, strontium, and/or especially barium. NEGs often include titanium, zirconium, or alloys thereof with one or more metals selected amongst aluminum and metal(s) of the first transition row. Both getter types, EGs and NEGs, require activation by heating for their operation to remove from the getter surface various oxides, carbides, and/or nitrides that otherwise inhibit the gaseous species to be removed from being sorbed on the getter's surface. Because of their high reactivity toward atmospheric gases, getters are typically made and transported in inactive form and require a suitable activating (e.g., flashing) heat treatment once they are arranged in the space to be evacuated.

EG 32 (e.g., of or including barium) can be provided below the pump-out tube 8 and at least partially in recess 14 in the glass substrate 2, being deposited in solid form. The location below the pump-out tube 8 is advantageous because it allows for more scattering of the EG material during activation/flashing thereby resulting in more active getter surface area.

The activation step for such an EG 32 includes evaporation of the metal (e.g., barium) onto the inner surfaces of the VIG unit, including onto the vertical, rounded or tilted sidewalls of recess 14 and/or onto the inner major surfaces of substrates 2, 3, and possibly into part of tube 8. Barium evaporation can be carried out either by heating a barium containing EG composition 32 from outside the VIG unit or by exposing the barium-inclusive EG composition to radio-frequency radiation. For example, when the EG composition 32 of the getter includes $BaAl_4$ and Ni for example, exposure of the getter material to radiation from a coil placed outside the VIG unit causes an increase in temperature of the powders to about 800-850 degrees C. At these temperatures, an exothermic reaction takes place between $BaAl_4$ and Ni, that causes a further rise in temperature to about 1100-1200 degrees C., at which temperature barium from the EG evaporates. The metal condenses in the form of a film on the adjacent inner surfaces of the VIG unit according to a so-called flash phenomenon, with the evaporated barium inclusive film being an active element in the gettering of undesired gases from the evacuated cavity 6. Thus, activation of the EG 32 causes the getter material to scatter to and become evaporated on adjacent areas inside the VIG unit via evaporation thereby increasing the surface area of gettering material. Thus, following activation/flashing, evaporated getter material is provided on the vertical, rounded or tilted sidewalls of getter recess 14 and/or on the inner major surface(s) of substrates 2 and/or 3 proximate the recess 14, and possibly into part of tube 8 and/or the sidewall of the hole for the tube 8. In the FIG. 5-15 embodiments, activation of the EG 32 causes the exothermic reaction to start which heats the EG to the point where getterable component(s) (e.g., Ba, Ca and/or Sr) is/are evaporated and substantially line-of-sight deposited (see arrows 44 which indicate the direction in which getter material proceeds during activation/evaporation) upon adjacent surfaces including across the cavity 6 onto the rough/porous coating 36 and/or recess 14' on the opposite substrate 3.

EG 32 may be made of any suitable material that functions as an evaporable getter. Such materials include, but are not limited to, compounds comprising an element(s) chosen from among calcium, strontium, and barium. Preferably such compounds are in the form of an allow to limit the reactivity of these elements to air. An example useful EG material is an intermetallic compound $BaAl_4$, which further may be admixed with nickel powder and possibly small quantities of one or more of Al, Fe, Ti and/or their alloys. Other EG materials will be familiar to those of skill in the art.

Use of evaporable getters (EGs) in VIG window units is constrained by the diminutive gap 6 between the glass substrates 2, 3. The very thin gap 6 in VIG window units limits the surface area that is coated with getter material when the EG is flashed (activated), and therefore limits the gettering capability of the getter material in the VIG unit. In EGs, it is the surface of the activated EG that sorbs residual gases from cavity 6. Unlike NEGs where a diffusion into the bulk can refresh surface gettering activity, once the activated/flashed EG surface is saturated the gettering/pumping action substantially ceases.

Figure 3:
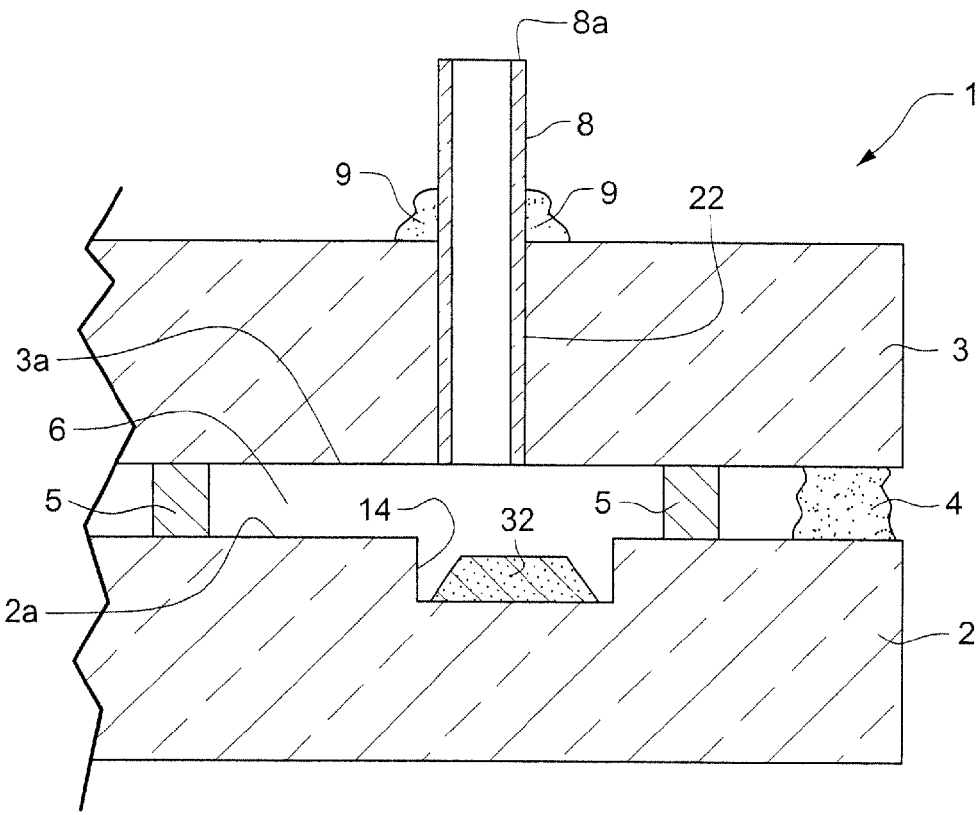
FIG. 3 is a schematic partial cross sectional diagram illustrating an example VIG window unit according to an example embodiment of this invention.

FIGS. 4a-4k are diagrams/views of gettering structures that can be used in the FIG. 3 and/or FIG. 5-15 VIG units according to example embodiments of this invention, in order to optimize (e.g., increase) the surface area of active getter material (e.g., activated EG) within the constraints of a VIG window unit 1. The getter structures in FIGS. 4a-4k may be used in and/or for recess 14 in the FIG. 3 embodiment, and/or may be used in and/or for one or both of recesses 14 and/or 14' in any of the FIG. 5-15 embodiments. In certain example embodiments of this invention, the surface of the transparent glass substrate 2 receiving the getter deposit (e.g., EG type getter) 32 may be contoured so as to increase the area of the active gettering surface following activation in the confined VIG space housing the getter (e.g., see FIGS. 4a-4d, 4f, and 4j-4k). Recesses 14 and/or 14' in the FIG. 5-15 embodiments may be cylindrical as illustrated, or may be designed/shaped as in any of FIG. 4a-4f, and/or 4j-4k.

Increasing of gettering surface area following activating/flashing of the EG 32 may be achieved by one or more of: (i) rounding and/or chamfering edge(s) of the cut/recess 14 in the smooth glass substrate 2 where the EG 32 is located so as to increase the scattering of getter material upon activation so that the EG is flashed over a larger area when activated (e.g., see FIGS. 4a, 4d, 4f, 4j and 4k), (ii) contouring the surface of substrate 2 receiving an EG deposit 32 so as to increase the area of the active gettering surface following activating/flashing in the confined space housing the getter (e.g., see FIGS. 4a, 4b, 4c, 4d, 4f, 4j and 4k), (iii) roughening the area of the otherwise substantially smooth glass substrate 2 receiving an EG deposit 32, such as via sandblasting, etching, grinding, and/or double drilling, so as to enable an increase in gettering material surface area before and after activating/flashing (e.g., see FIGS. 4b, 4c, 4d, 4j), (iv) pre-depositing in the area to receive an EG deposit 32 a rough (e.g., nodular) and/or porous coating 36, such as via sol gel or selected frit application, in order to promote porosity in the getter deposit 32 which increases the getter's sorption capacity before and/or after activating/flashing (e.g., see FIGS. 4e and 4f), (v) using EG material 32 that is provided in a getter container 38 that is shaped with at least one open area(s)/side(s) 40 to optimize scattering and/or evaporation direction(s) of gettering material upon activation/flashing in the evacuated cavity (e.g., see FIGS. 4g, 4h and 4i), and/or (vi) providing any suitable recess 14' and/or roughened surface or coating 36 on the substrate 3 opposite the original getter 32 location so as to be across the low pressure cavity 6 from the original getter location so as to increase the area of active gettering surface on the opposite substrate following EG activation/flashing (e.g., see FIGS. 5-15 and 4a-4k). Any or the above embodiments/features (i), (ii), (iii), (iv), (v), and/or (vi) may or may not be used in combination with any of the other embodiments/features (i), (ii), (iii), (iv), (v), and (vi) in different embodiments of this invention. For example, embodiment/feature (i) may or may not be used in combination with any of (ii)-(vi) in different embodiments of this invention. Likewise, any or the above embodiments/features shown in FIGS. 4a-4k may or may not be used in combination with any of the other embodiments/features shown in FIGS. 4a-4k. For example, the roughness on the surface of the glass in getter recess 14 in the FIG. 4d embodiment may be used in combination with any of the embodiments of FIG. 4a, 4b, 4e, 4f, 4j, and/or 4k.

Figure 4A:
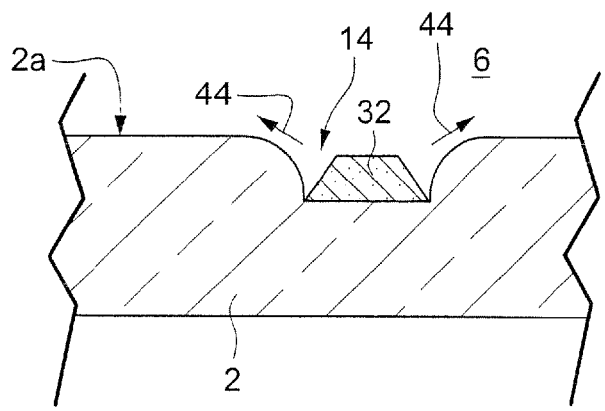
FIG. 4a is a schematic partial side cross sectional diagram illustrating a gettering structure that may be used in the FIG. 3 and/or FIG. 5-15 VIG unit according to an example embodiment of this invention.

FIG. 4a is a schematic partial side cross sectional diagram illustrating a gettering structure that may be used in the FIG. 3 and/or FIG. 5-15 VIG unit 1 according to an example embodiment of this invention. The sidewalls/edges of getter recess 14 are rounded or chamfered at least at the upper portion of the recess so as to allow evaporating getter material to scatter more widely (see arrows 44) during getter activating/flashing, so as to result in more active gettering surface following activating/flashing of the EG 32. Thus, the rounding and/or chamfering of the upper corners of the getter recess 14 in FIG. 4a allows the getter material from EG 32 to scatter more widely and further during activating/flashing, so that the result is more active gettering surface compared to when the simple cylindrical getter recess with flat bottom is provided as shown in FIG. 3. Thus, the gettering structure of FIG. 4a allows more undesirable gases to be absorbed in terms of volume and/or time by the EG following activation/flashing, compared to the gettering structure of FIG. 3. The rounded and/or chamfered getter recess corners/edges in FIG. 4a can be formed by drilling a recess 14 as shown in FIG. 3, and then polishing or grinding/buffing down the upper corners/edges thereof until the structure shown in FIG. 4a is achieved. As with other embodiments herein, the getter recess 14 in which the EG 32 is originally deposited in solid form may be round, oval, or rectangular in shape as viewed from above in different example embodiments of this invention. Any of the recesses 14' in glass substrate 3 (e.g., see FIGS. 5, 7-8, 10-11, 13-15) may also be shaped as in FIG. 4a in certain example embodiments of this invention, except that no EG is present prior to activation in recesses 14'.

Figure 4B:
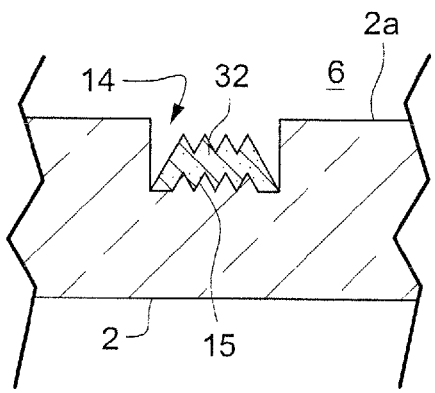
FIG. 4b is a schematic partial side cross sectional diagram illustrating a gettering structure that may be used in the FIG. 3 and/or FIG. 5-15 VIG unit according to an example embodiment of this invention.

FIG. 4b is a schematic partial side cross sectional diagram illustrating a gettering structure that may be used in the FIG. 3 and/or FIG. 5-15 VIG unit 1 according to another example embodiment of this invention. At least the base or bottom wall of getter recess 14 defined in the glass 2 is roughened 15 (e.g., by grinding and/or etching the glass substrate at the bottom of the recess 14) to allow the deposited EG to have more exposed surface area before and/or after activating/flashing. The result is more active gettering surface following activating/flashing of the EG 32. Thus, the roughening 15 of at least the base of the recess 14 in FIG. 4b allows the getter material from EG 32 to realize more active gettering surface compared to when the simple cylindrical getter recess with flat base is provided as shown in FIG. 3. Thus, the gettering structure of FIG. 4b allows more undesirable gases to be absorbed in terms of volume and/or time by the EG following activation/flashing, compared to the gettering structure of FIG. 3. The recess 14 in FIG. 4b can be formed by drilling a recess as shown in FIG. 3, and then roughening 15 the bottom glass surface of the recess via grinding with a grinding wheel, sandblasting, and/or etching via wet glass etchant, until the roughened structure shown in FIG. 4b is achieved so that the roughened surface 15 is rougher than the majority of the major interior surfaces 2a, 3a of glass substrates 2, 3. The bottom surface of the recess 14 in FIG. 4b is substantially rougher than is the major interior surface 2a of glass substrate 2. The gettering structure of FIG. 4b may or may not be used in combination with the gettering structure of FIG. 4a. Also, any of the recesses 14' in glass substrate 3 (e.g., see FIGS. 5, 7-8, 10-11, 13-15) may also be shaped with roughness 15 as in FIG. 4b in certain example embodiments of this invention, except that no EG is present in 14' prior to EG getter activation.

Figure 4C:
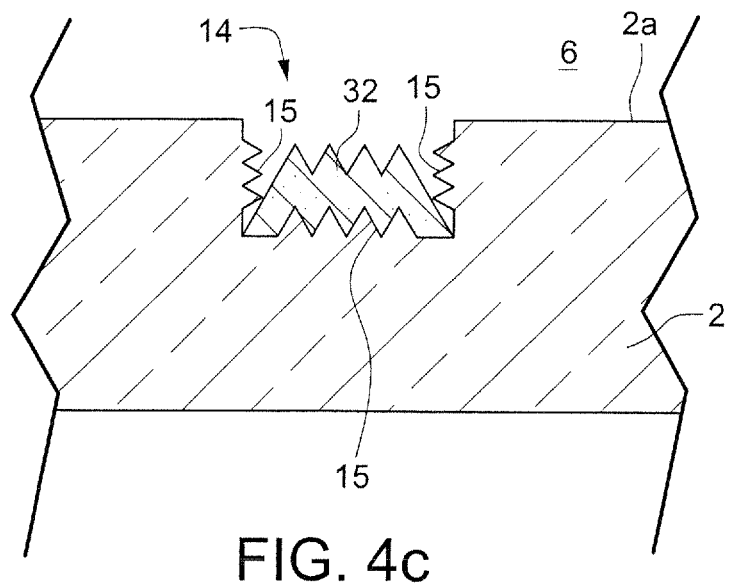
FIG. 4c is a schematic partial side cross sectional diagram illustrating a gettering structure that may be used in the FIG. 3 and/or FIG. 5-15 VIG unit according to an example embodiment of this invention.

FIG. 4c is a schematic partial side cross sectional diagram illustrating a gettering structure that may be used in the FIG. 3 and/or FIG. 5-15 VIG unit 1 according to another example embodiment of this invention. The base or bottom wall, and the sidewall(s), of getter recess 14 defined in the glass 2 are roughened 15 (e.g., by grinding and/or etching the glass substrate in recess 14) to allow the deposited EG to have more exposed surface area before and/or after activating/flashing. The result is more active gettering surface following activating/flashing of the EG 32. Thus, the roughening of the base and sidewall of the recess 14 in FIG. 4c to form roughened surface 15 allows the getter material from EG 32 to realize more active gettering surface compared to when the simple cylindrical getter recess with flat base and flat sidewall is provided as shown in FIG. 3. Thus, the gettering structure of FIG. 4c allows more undesirable gases to be absorbed in terms of volume and/or time by the EG following activation/flashing, compared to the gettering structure of FIG. 3. The recess 14 in FIG. 4c can be formed by drilling a recess as shown in FIG. 3, and then roughening the bottom and sidewall glass surfaces of the recess via grinding with a grinding wheel, sandblasting, and/or etching via wet glass etchant, until the roughened surface 15 shown in FIG. 4c is achieved. The roughened bottom and sidewall surface 15 of the recess 14 in FIG. 4c is/substantially rougher than is the major interior surface 2a of glass substrate 2. The gettering structure of FIG. 4c may or may not be used in combination with the gettering structure(s) of FIG. 4a and/or 4b. Also, any of the recesses 14' in glass substrate 3 (e.g., see FIGS. 5, 7-8, 10-11, 13-15) may also be shaped and/or provided with roughness 15 as in FIG. 4c in certain example embodiments of this invention, except that no EG is present in 14' prior to EG getter activation.

Figure 4D:
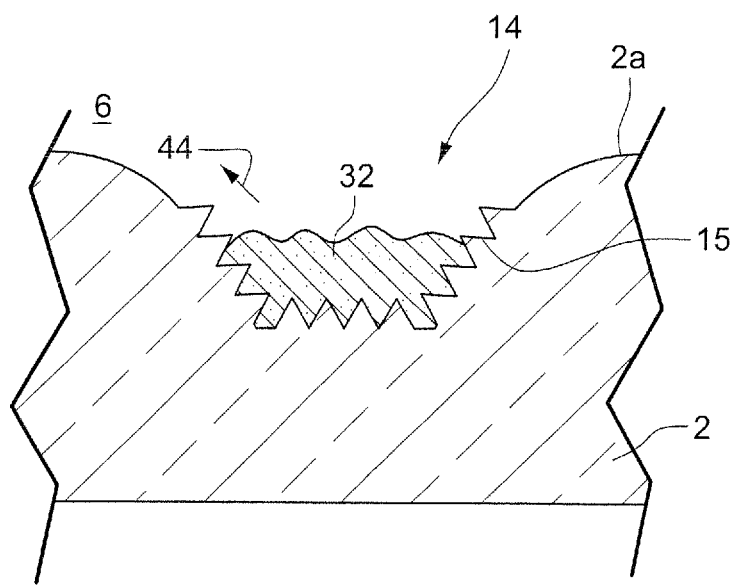
FIG. 4d is a schematic partial side cross sectional diagram illustrating a gettering structure that may be used in the FIG. 3 and/or FIG. 5-15 VIG unit according to an example embodiment of this invention.

FIG. 4d is similar to a combination of the embodiments of FIGS. 4a and 4c described above, and is a schematic partial side cross sectional diagram illustrating a gettering structure that may be used in the FIG. 3 and/or FIG. 5-15 VIG unit 1 according to yet another example embodiment of this invention. The base or bottom wall, and the angled non-vertical sidewall(s), of getter recess 14 defined in the glass 2 are roughened 15 (e.g., by grinding and/or etching the glass substrate in recess 14) to allow the deposited EG to have more exposed surface area before and/or after activating/flashing. The result is more active gettering surface following activating/flashing of the EG 32 for the reasons explained above in connection with FIGS. 4*a* and 4*c*. The recess 14 in FIG. 4*d* can be formed by drilling a recess as shown in FIG. 3, rounding/chamfering as explained above in connection with FIG. 4*a*, and then roughening the bottom and sidewall glass surfaces of the recess via grinding with a grinding wheel, sandblasting, and/or etching via wet glass etchant, until the roughened structure 15 shown in FIG. 4*d* is achieved. The roughened bottom and sidewall surface 15 of the recess 14 in FIG. 4*d* is substantially rougher than is the major interior surface 2*a* of glass substrate 2. The gettering structure of FIG. 4*d* may or may not be used in combination with the gettering structure(s) of any of FIGS. 4*a*-4*c*. Also, any of the recesses 14' in glass substrate 3 (e.g., see FIGS. 5, 7-8, 10-11, 13-15) may also be shaped and/or provided with roughness 15 as in FIG. 4*d* in certain example embodiments of this invention, except that no EG is present in the recess 14' opposing the getter 32 prior to EG getter activation.

Figure 4E:
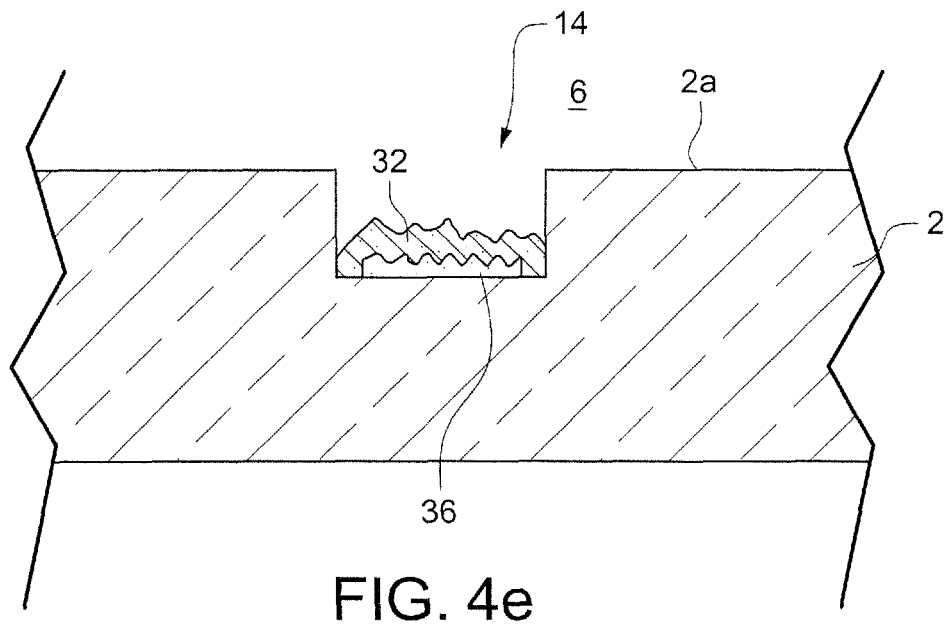
FIG. 4e is a schematic partial side cross sectional diagram illustrating a gettering structure that may be used in the FIG. 3 and/or FIG. 5-15 VIG unit according to an example embodiment of this invention.

FIG. 4*e* is a schematic partial side cross sectional diagram illustrating a gettering structure that may be used in the FIG. 3 and/or FIG. 5-15 VIG unit 1 according to another example embodiment of this invention. At least the base or bottom wall of getter recess 14 defined in the glass 2 is roughened by pre-depositing rough coating 36 thereon to allow the deposited EG to have more exposed surface area before and/or after activating/flashing. In particular, there is pre-deposited in the area to receive EG deposit 32 a rough (e.g., nodular) and/or porous coating 36, such as via sol gel or selected frit application, in order to promote porosity in the getter deposit 32 which increases the getter's sorption capacity before and/or after activating/flashing. The result is more active gettering surface following activating/flashing of the EG 32. Thus, the roughening of at least the base of the recess 14 in FIG. 4*e* via the rough coating 36 that supports the EG 32 allows the getter material from EG 32 to realize more active gettering surface compared to when the simple cylindrical getter recess with flat base is provided as shown in FIG. 3. Thus, the gettering structure of FIG. 4*e* allows more undesirable gases to be absorbed in terms of volume and/or time by the EG following activation/flashing, compared to the gettering structure of FIG. 3. The bottom surface of the recess 14 (i.e., the upper surface of the coating 36) in FIG. 4*e* is substantially rougher than is the major interior surface 2*a* of glass substrate 2. The gettering structure of FIG. 4*e* may or may not be used in combination with the gettering structure of any of FIGS. 4*a*-4*d*. Also, any of the recesses 14' in glass substrate 3 (e.g., see FIGS. 5, 7-8, 10-11, 13-15) may also be provided with such a rough/porous coating 36 in certain example embodiments of this invention, noting that no EG is present in recess 14' prior to EG getter activation.

Figure 4F:
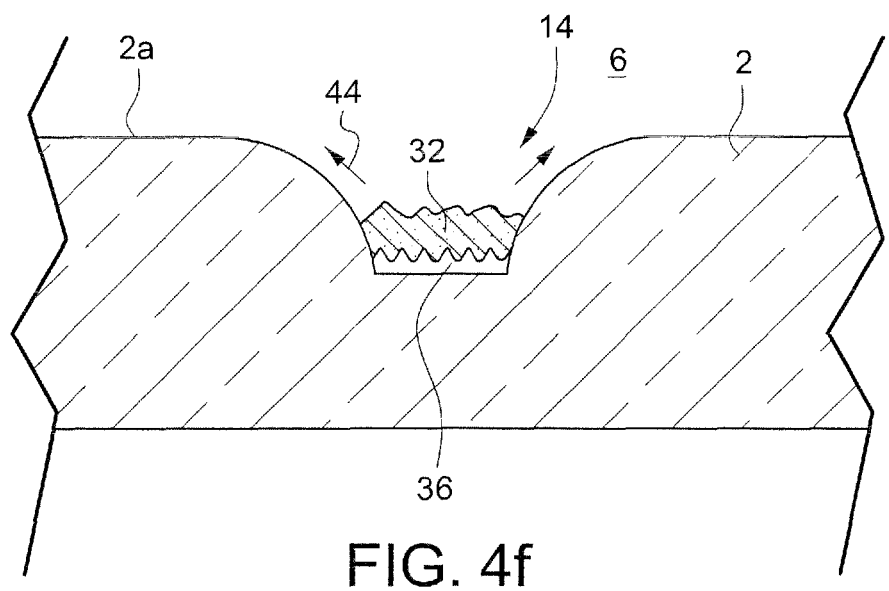
FIG. 4f is a schematic partial side cross sectional diagram illustrating a gettering structure that may be used in the FIG. 3 and/or FIG. 5-15 VIG unit according to an example embodiment of this invention.

FIG. 4*f* is a combination of the embodiments of FIGS. 4*a* and 4*e* described above, and is a schematic partial side cross sectional diagram illustrating a gettering structure that may be used in the FIG. 3 and/or FIG. 5-15 VIG unit 1 according to yet another example embodiment of this invention. At least the base or bottom wall of getter recess 14 defined in the glass 2 is roughened by pre-depositing rough coating 36 thereon to allow the deposited EG to have more exposed surface area before and/or after activating/flashing. The sidewalls of the recess are also rounded/chamfered, to allow the EG to scatter further during activating/flashing. The result is more active gettering surface following activating/flashing of the EG 32 for the reasons explained above in connection with FIGS. 4*a* and 4*e*. The bottom surface of the recess 14 (i.e., the upper surface of the coating 36) in FIG. 4*f* is substantially rougher than is the major interior surface 2*a* of glass substrate 2. Also, any surface of any of the recesses 14' in glass substrate 3 (e.g., see FIGS. 5, 7-8, 10-11, 13-15) may also be provided with such a rough/porous coating 36 in certain example embodiments of this invention.

Figure 4G:
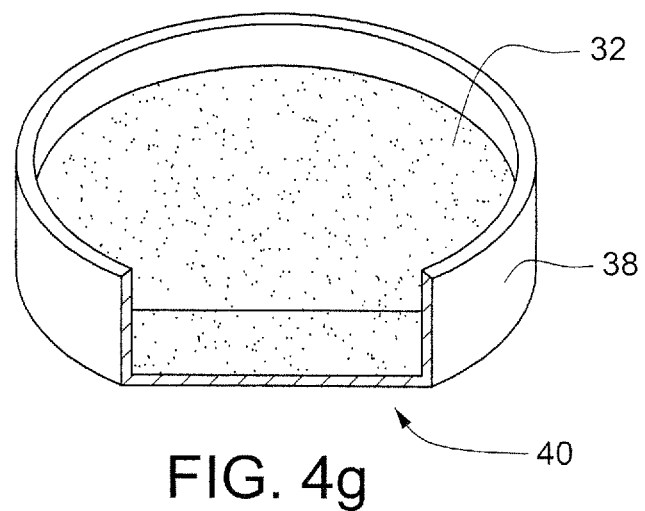
FIG. 4g is a schematic partial perspective diagram illustrating a gettering structure including gettering material in a getter container that may be used in the FIG. 3 and/or FIG. 5-15 VIG unit according to an example embodiment of this invention.
Figure 4H:
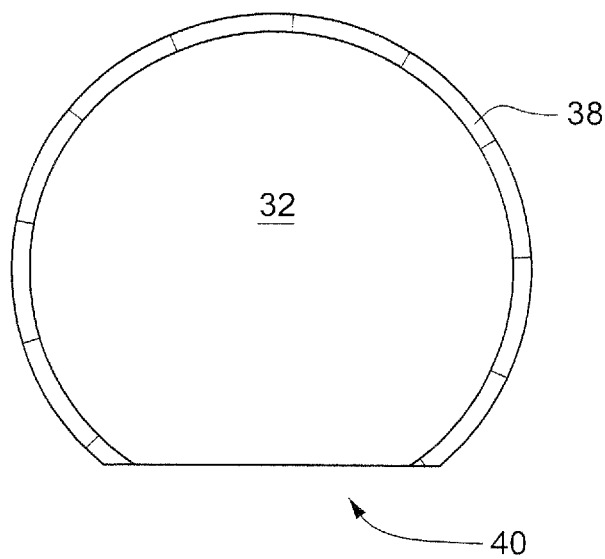
FIG. 4h is a top cross sectional diagram of the gettering structure of FIG. 4g.
Figure 4I:
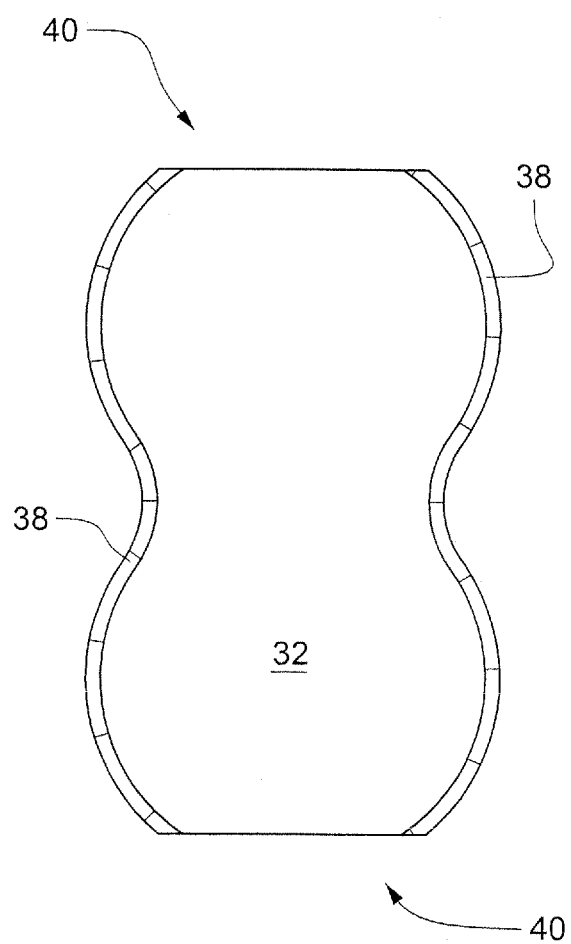
FIG. 4i is a top cross sectional diagram illustrating illustrating a gettering structure including gettering material in a getter container that may be used in the FIG. 3 and/or FIG. 5-15 VIG unit according to an example embodiment of this invention.

In the embodiments of FIGS. 4*a*-4*f* (and FIGS. 4*j*-4*k*), it is illustrated that the EG material 32 is deposited directly onto the glass substrate 2. However, in other example embodiments, including any of FIG. 4*a*-4*f* and/or 4*j*-4*k*, the EG 32 may be provided in a container that encompasses at least part of the getter material prior to and/or after deposition and/or activating. For example, FIG. 4*g* illustrates an embodiment where the EG 32 is provided within a getter container (e.g., metallic container) 32. FIG. 4*h*, which is a top view of FIG. 4*g*, illustrates that the container 38 is substantially C-shaped as viewed from above so as to have open side/end 40 where the getter material is more exposed. Such a structure is advantageous for VIG applications because the open side/end 40 of the getter container allows the scattering direction of getter material during activating/flashing to be controlled in particular direction(s) within the low pressure cavity 6 of the VIG unit 1. The evaporating flux is broadened with this shaped container, where the substantial C-shaped cross section produces a substantially radial evaporated flux during flashing/activating. For example, as viewed from above, the getter container 38 of FIGS. 4*g*-4*h* can be positioned within a getter recess 14 and/or on a substrate 2 in any of FIG. 3, 5-15 and/or 4*a*-4*f*. The open side 40 of the container is particularly designed to face in any desired direction, such as in a direction away from or substantially parallel to the closest edge seal 4. The open end 40 allows more getter material to scatter outwardly during activating/flashing so that more active getter material from the EG densifies on the sidewall(s) of the getter recess 14 and/or on adjacent surfaces inside the cavity 6.

FIG. 4*i* is similar to the embodiment of FIG. 4*g*-4*h* described above, except that the container 38 in the FIG. 4*i* embodiment has two open sides 40. This allows still further active getter material to scatter outwardly during activating/flashing so that more active getter material from the EG densifies on the sidewall(s) of the getter recess 14 and/or on adjacent surfaces inside the cavity 6. The example containers, or any other shaped container, may be used in any of the embodiments of FIGS. 5-15.

Figure 4J:
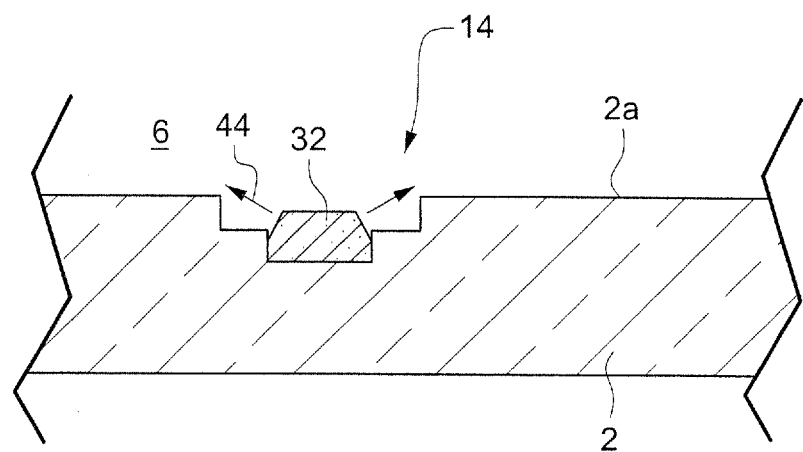
FIG. 4j is a schematic partial side cross sectional diagram illustrating a gettering structure that may be used in the FIG. 3 and/or FIG. 5-15 VIG unit according to an example embodiment of this invention.

FIG. 4*j* is a schematic partial side cross sectional diagram illustrating a gettering structure that may be used in the FIG. 3 and/or FIG. 5-15 VIG unit 1 according to another example embodiment of this invention. The getter recess 14 is double drilled (using a first and second drill bits of different sizes) so that the recess has a stepped structure which allows evaporating getter material to scatter more widely (see arrows 44) during getter activating/flashing, so as to result in more active gettering surface following activating/flashing of the EG 32. Thus, the stepped recess 14 in FIG. 4*j* allows the getter material from EG 32 to scatter more widely and further during activating/flashing, so that the result is more active gettering surface compared to when the simple cylindrical getter recess is provided as shown in FIG. 3. Thus, the gettering structure of FIG. 4*j* allows more undesirable gases to be absorbed in terms of volume and/or time by the EG following activation/flashing, compared to the gettering structure of FIG. 3.

Figure 4K:
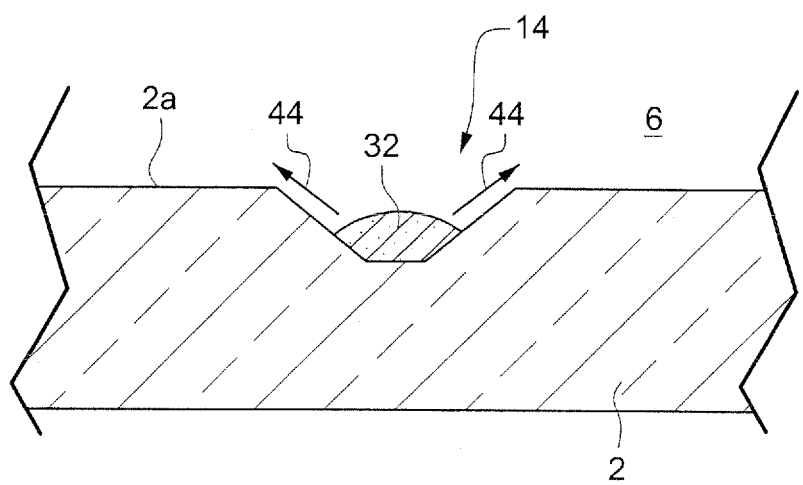
FIG. 4k is a schematic partial side cross sectional diagram illustrating a gettering structure that may be used in the FIG. 3 and/or FIG. 5-15 VIG unit according to an example embodiment of this invention.

The FIG. 4k embodiment is the same as the FIG. 4a embodiment, except that the sidewalls are substantially flat instead of being rounded/curved. Thus, the FIG. 4 embodiment may be made and is advantageous for the reasons explained above in connection with FIG. 4a. Also, any of the recesses 14' in glass substrate 3 (e.g., see FIGS. 5, 7-8, 10-11, 13-15) may be shaped like recess 14 in FIG. 4j or FIG. 4k in certain example embodiments of this invention, noting that no EG is present in recess 14' prior to EG getter activation.

Figure 5:
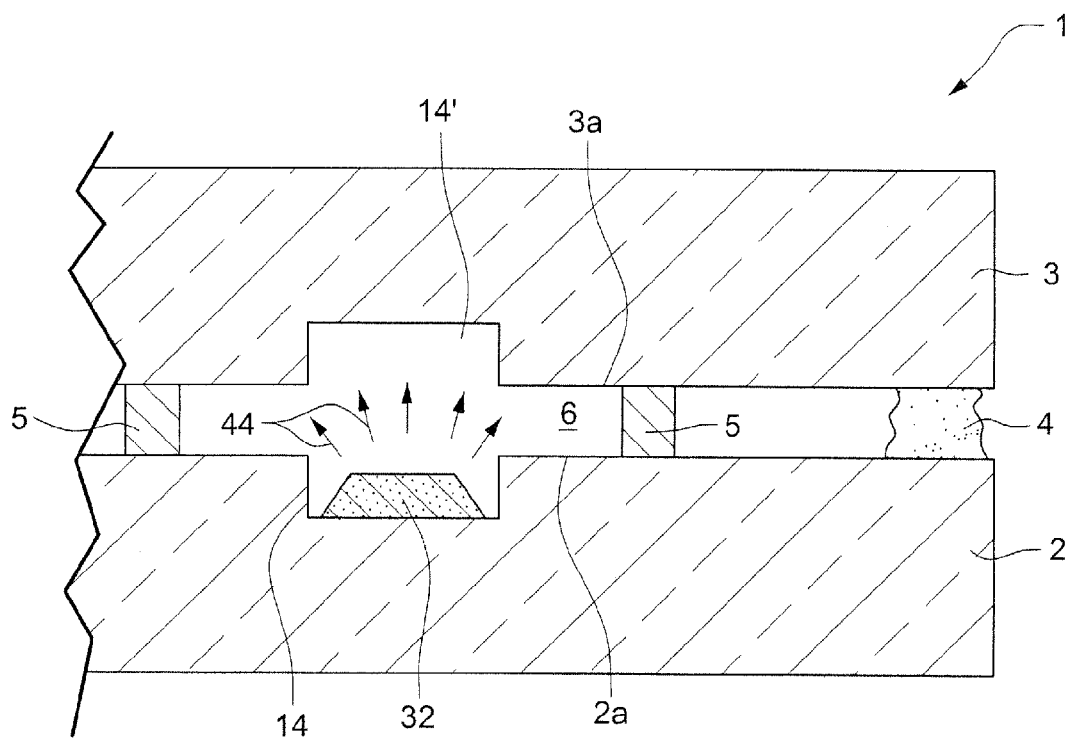
FIG. 5 is a schematic partial cross sectional diagram illustrating an example VIG window unit according to an example embodiment of this invention.
Figure 6:
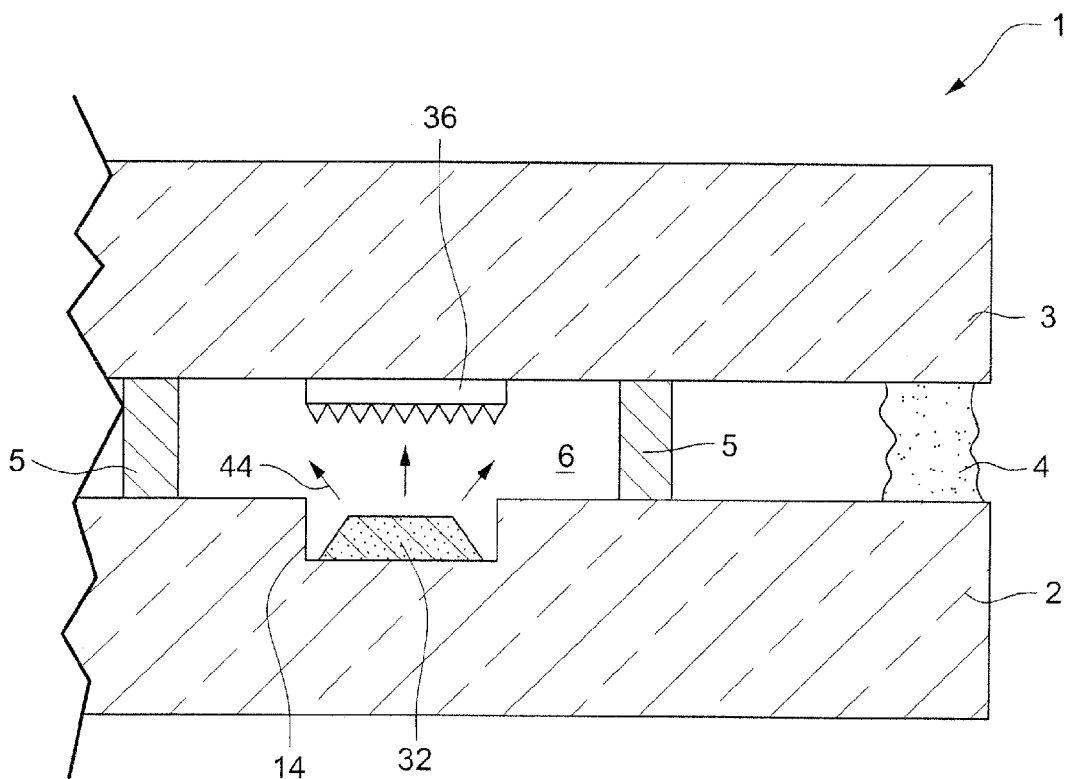
FIG. 6 is a schematic partial cross sectional diagram illustrating an example VIG window unit according to an example embodiment of this invention.
Figure 7:
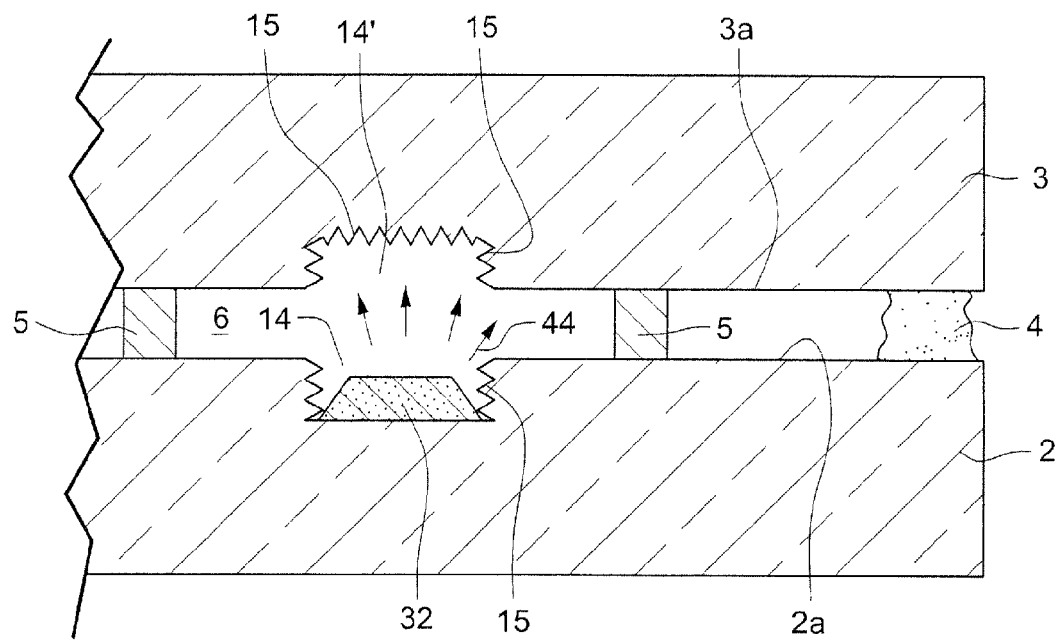
FIG. 7 is a schematic partial cross sectional diagram illustrating an example VIG window unit according to another example embodiment of this invention.
Figure 8:
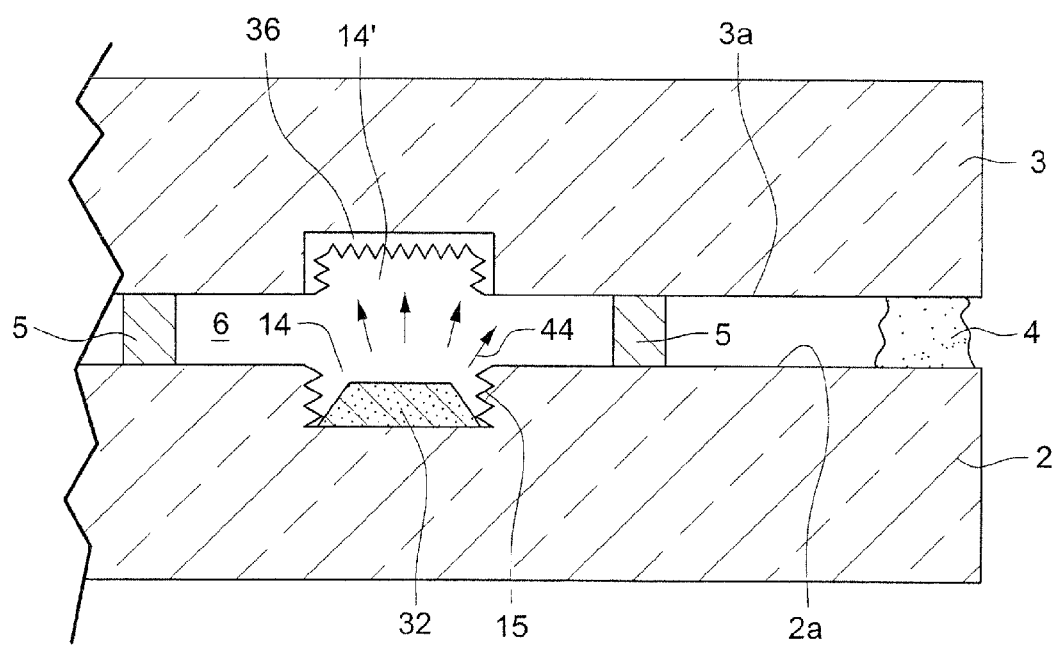
FIG. 8 is a schematic partial cross sectional diagram illustrating an example VIG window unit according to another example embodiment of this invention.
Figure 9:
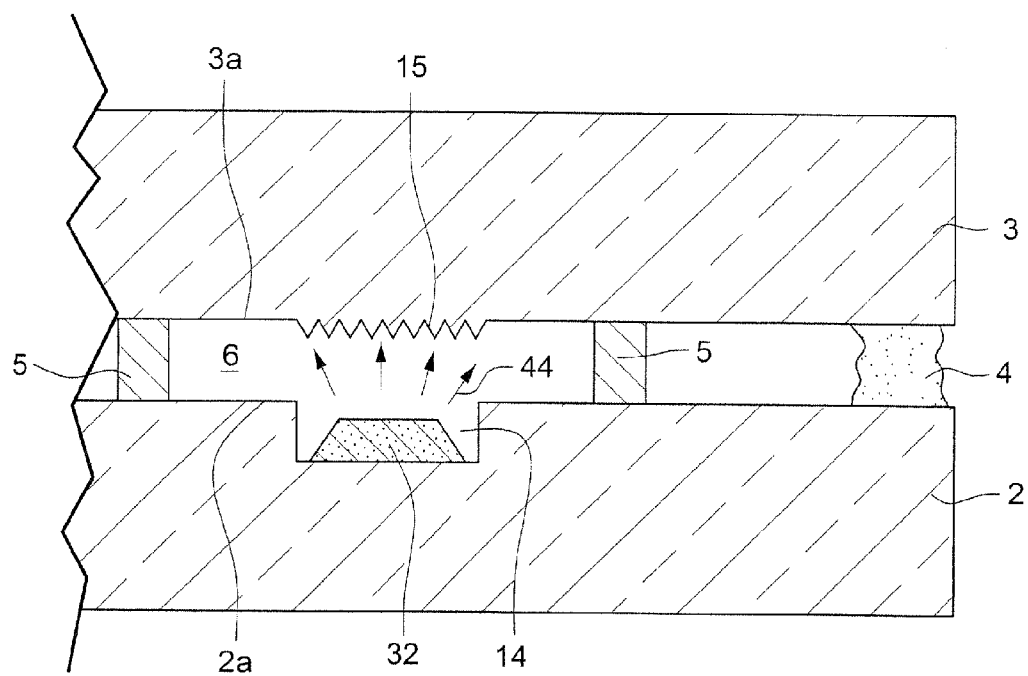
FIG. 9 is a schematic partial cross sectional diagram illustrating an example VIG window unit according to another example embodiment of this invention.
Figure 10:
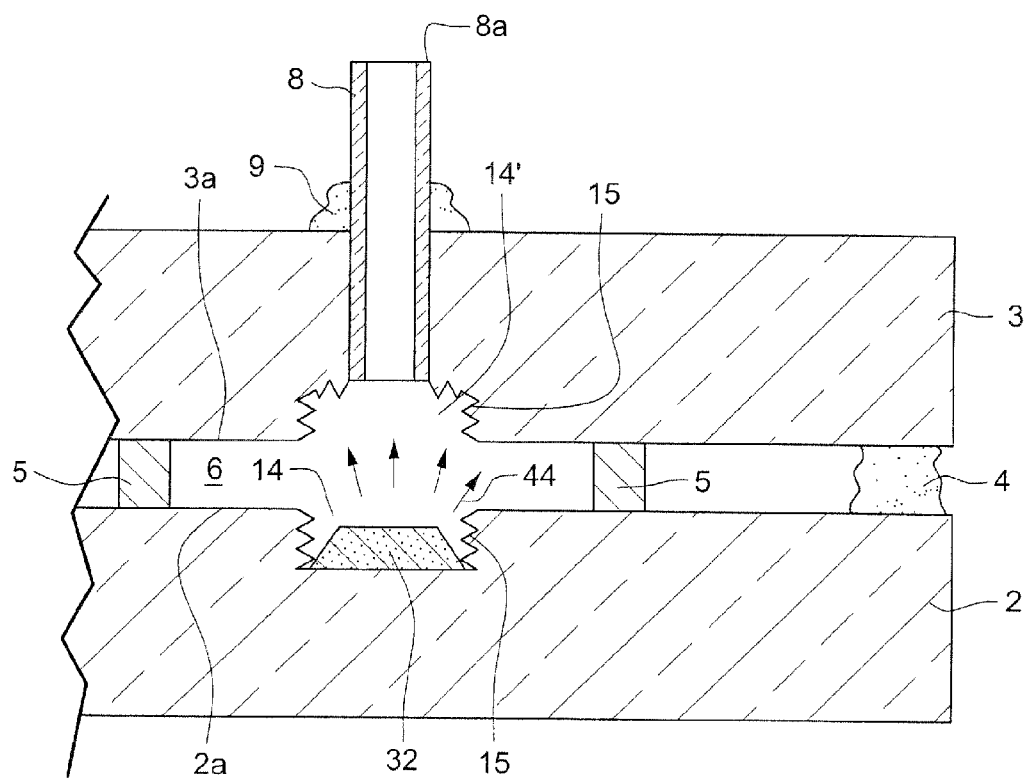
FIG. 10 is a schematic partial cross sectional diagram illustrating an example VIG window unit according to another example embodiment of this invention.
Figure 11:
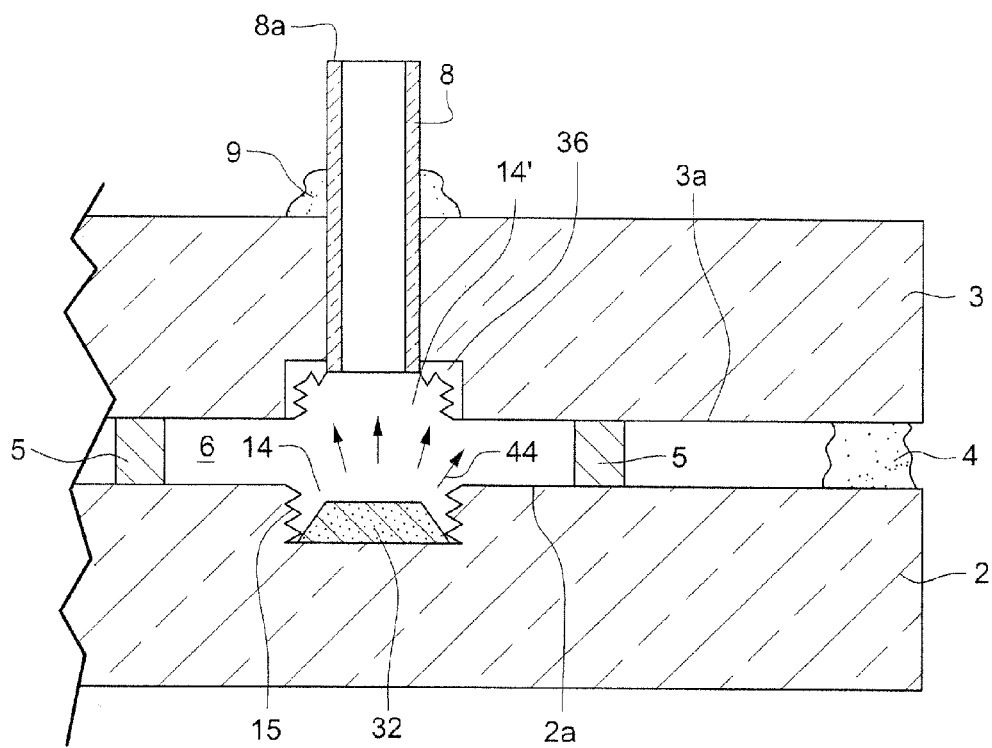
FIG. 11 is a schematic partial cross sectional diagram illustrating an example VIG window unit according to another example embodiment of this invention.
Figure 12:
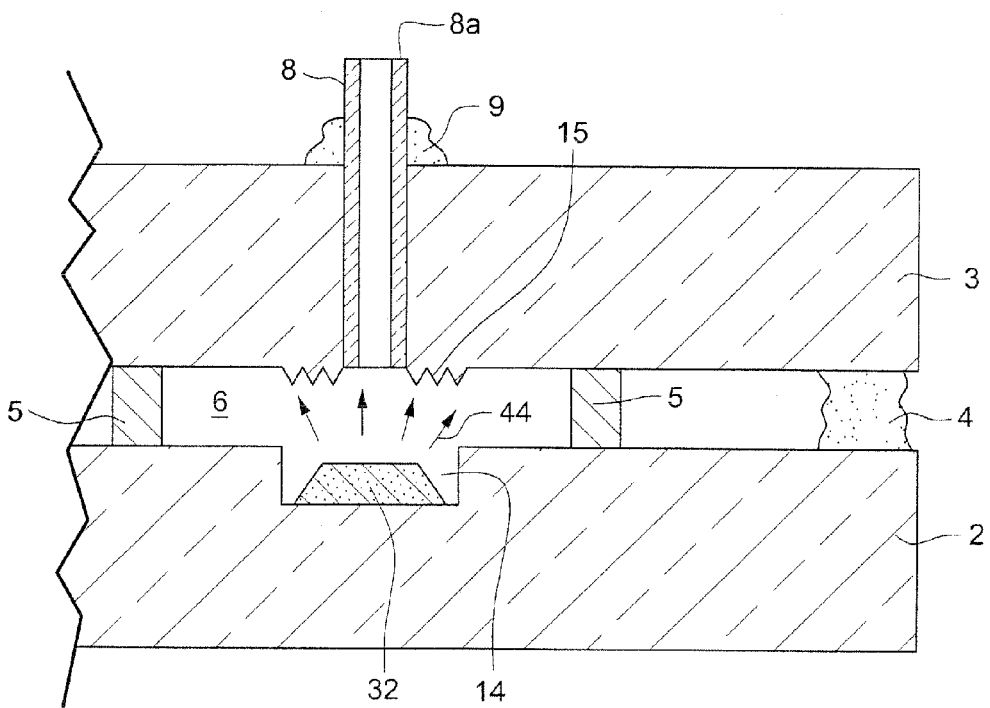
FIG. 12 is a schematic partial cross sectional diagram illustrating an example VIG window unit according to another example embodiment of this invention.
Figure 13:
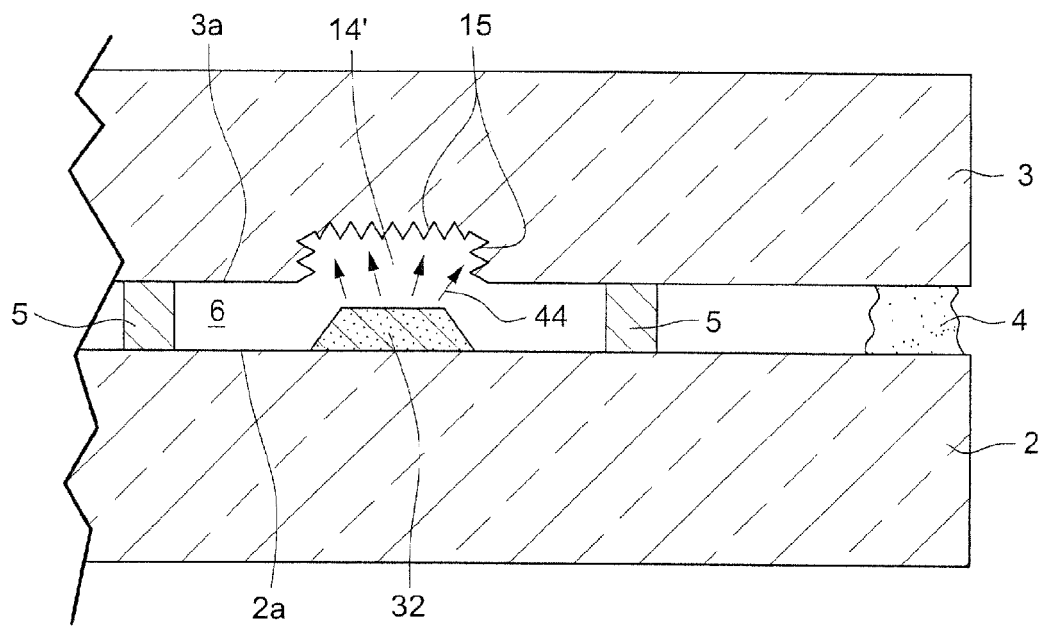
FIG. 13 is a schematic partial cross sectional diagram illustrating an example VIG window unit according to another example embodiment of this invention.
Figure 14:
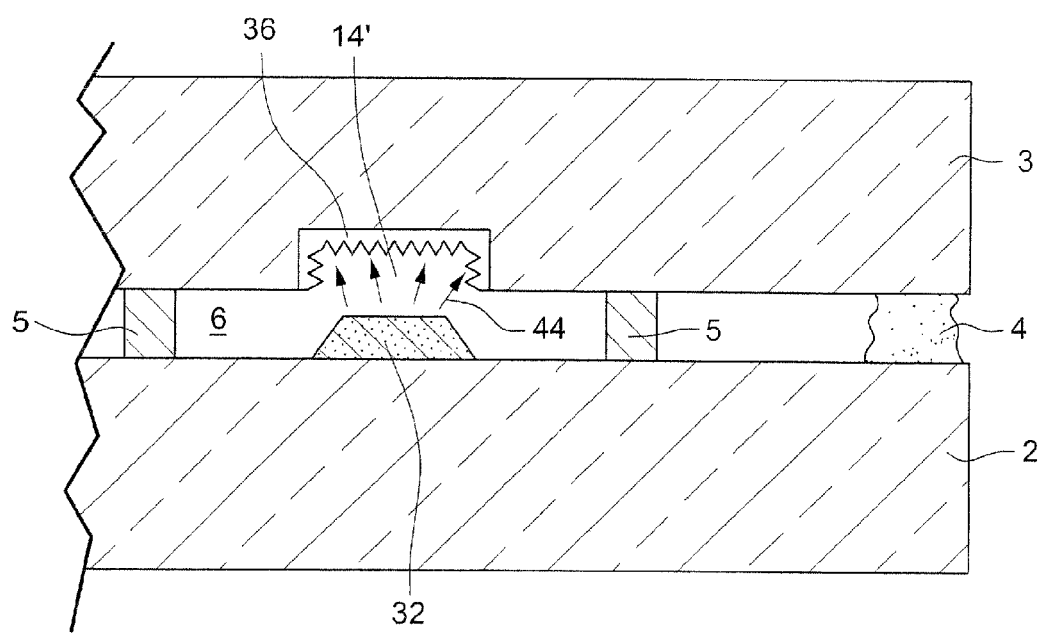
FIG. 14 is a schematic partial cross sectional diagram illustrating an example VIG window unit according to another example embodiment of this invention.
Figure 15:
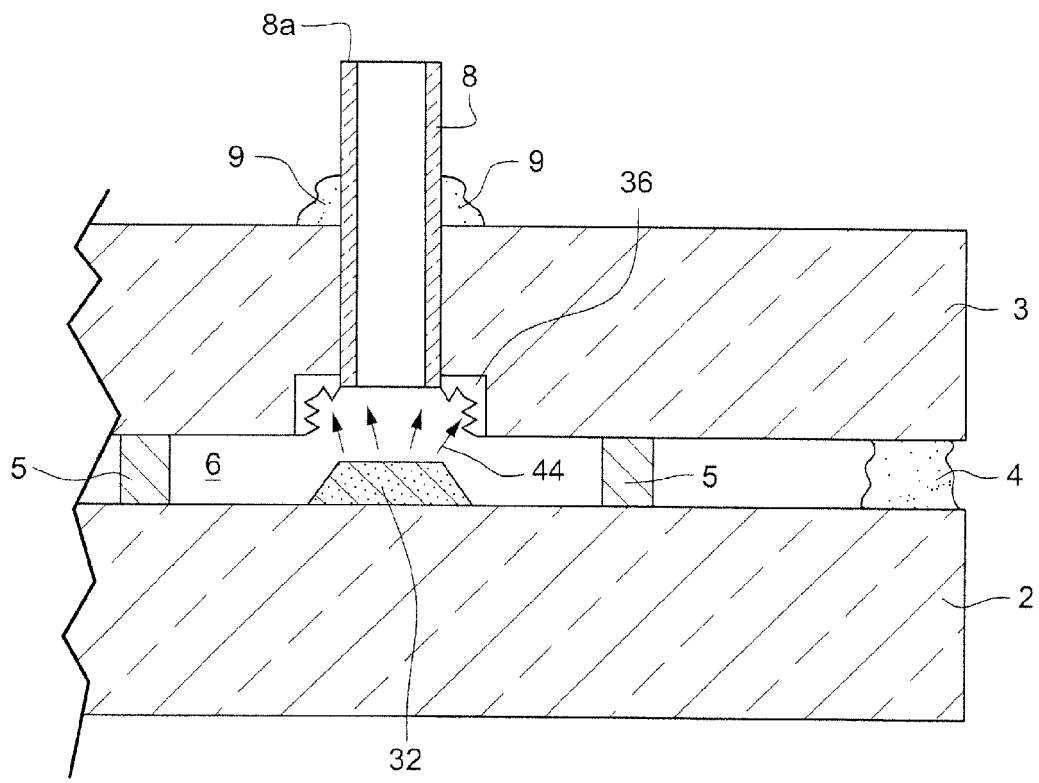
FIG. 15 is a schematic partial cross sectional diagram illustrating an example VIG window unit according to another example embodiment of this invention.

FIGS. 5-11 and 13-15 illustrate embodiments of this invention where, optionally in addition to the getter recess 14 in substrate 2 shown in FIG. 3, there is provided a getter recess 14' in/on the glass substrate 3 opposite the original getter 32 location so as to be across the low pressure cavity 6 from the original getter location so as to increase the area of active gettering surface on the opposite substrate following EG activation/flashing and movement 44 of EG material from substrate 2 toward and onto substrate 3 during and/or as a result of activation/flashing. When the getter 32 on substrate 2 is activated, evaporation causes getter material to deposit on the opposite substrate 3 across the cavity proximate to the original getter location, and the provision of recess 14' in that area of substrate 3 results in additional getter material surface area being formed on the opposing substrate 3 following activation/flashing. The recess 14' in substrate 3 located opposite the original getter 32 location may or may not be provided with roughened surface area. For example, FIGS. 7, 10, and 13 show that the base and/or sidewall(s) of recess 14' in substrate 3 may be roughened and/or provided with a rough surface 15, which rough surface 15 is more rough than the interior major surface 3a of substrate 3. The recess 14' in substrate 3 located opposite the original getter 32 location may or may not be provided with rough and/or porous coating 36 (possibly in addition to the roughened glass surface 15). For example, FIGS. 8, 11, and 14-15 show that the base and/or sidewall(s) of recess 14' in substrate 3 may be provided with rough and/or porous coating 36 which is more rough than the interior major surface 3a of substrate 3. Optionally, as shown in FIGS. 10-11 and 15, the pump-out tube 8 may be provided in recess 14', with the interior of the tube 8 providing still further surface area upon which the getter material may depositing due to activation/flashing. In certain example embodiments of this invention, such as those shown in FIGS. 6, 9 and 12, there need be no recess 14' in substrate 3 opposite the original getter position. FIGS. 6, 9 and 12 illustrate that the surface of the substrate 3 opposite the original EG 32 location can be roughened, via a coating 36 and/or via roughening the glass, so as to provided increased surface area for the activated EG to deposit due to activation/flashing.

Moreover, while the EG 32 is originally located in a recess 14 in/on substrate 2 in certain preferred embodiments of this invention (e.g., see FIGS. 3 and 7-12), the EG 32 need not be originally located in a recess. For example, in the embodiments of FIGS. 13-15, the EG 32 is originally located on the major interior surface 2a of glass substrate 2 and not in a recess. In these embodiments, a recess 14' and/or roughening is/are provided on the other substrate 3 opposite the EG location in order to provided additional surface area for active EG material to deposit due to activation/flashing.

Any of the getter structures of FIGS. 4a-4k may be used for the getter structure/recess 14 in the FIG. 5 embodiment (or for any of the embodiments of FIGS. 7-12). Likewise, while the recesses 14 and/or 14' in FIGS. 5-15 may or may not be cylindrical in shape in certain instances, any of the getter structures of FIG. 4a-4f or 4j-4k (absent the original getter material prior to activation) may be used for the getter structure/recess 14' on the opposite substrate 3 in any of the embodiments of FIGS. 5-15.

FIG. 6 illustrates an embodiment where, in addition the getter recess 14 shown in FIG. 3, there is provided an additional roughened and/or porous coating 36 on the substrate 3 opposite the original getter 32 location so as to be across the low pressure cavity 6 from the original getter location so as to increase the area of active gettering surface on the opposite substrate following EG activation/flashing. When the getter 32 on substrate 2 is activated, evaporation causes getter material to deposit on the opposite substrate 3 including on coating 36 across the cavity proximate to the original getter location, and the provision of rough and/or porous coating 36 in that area results in additional getter material surface area being formed on the opposing substrate 3 following activation/flashing compared to if only the smooth substrate 3 surface were in that location. Any of the getter structures of FIGS. 4a-4k may be used for the getter structure/recess 14 in the FIG. 6 embodiment, and likewise any of the getter structures of FIGS. 4e-4f (absent the original getter material prior to activation) may be used for or in the coating area 36 on the opposite substrate 3 in the FIG. 6 embodiment.

Thus, it will be appreciated that in FIGS. 4a-4k the getter recess 14 and/or getter container 38 in the getter recess is/are shaped to increase evaporated getter material surface area, with evaporated getter material being the getter material that is present (e.g., present in/on one or more of: getter recess sidewall(s), getter recess, interior major surface(s) of one or both substrates proximate the getter recess, and/or pump-out tube recess and/or tube itself) following activation and/or flashing of getter that included EG type material. In FIGS. 5-15 the getter structure (14', 15 and/or 36) on the opposite substrate 3 is shaped/designed to increase evaporated getter material surface area following getter activation.

Figure 16:
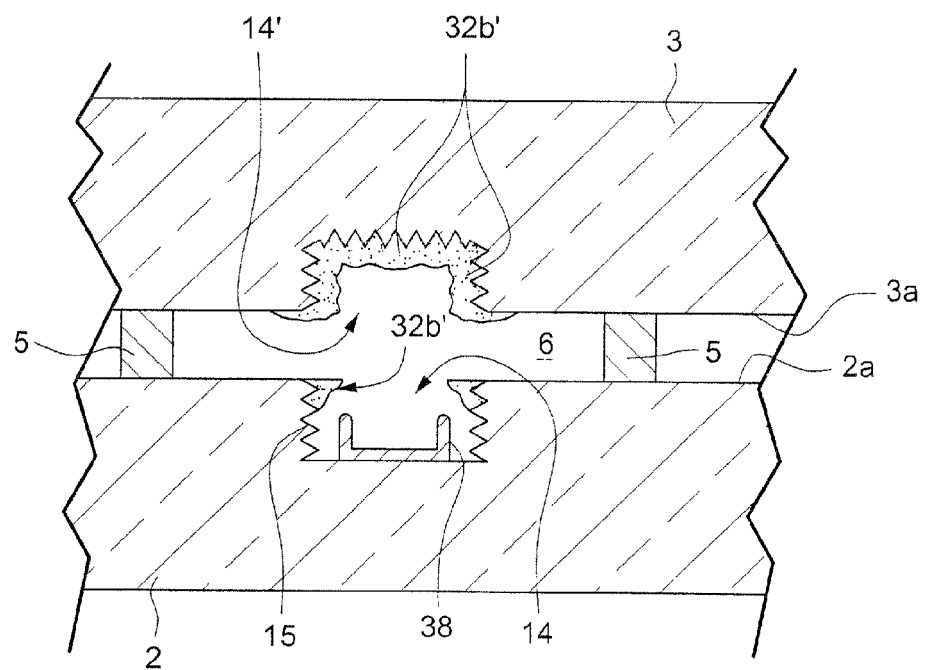
FIG. 16 is a schematic partial cross sectional diagram illustrating an example VIG window unit according to the FIG. 7 embodiment, after flashing/activating an EG getter, according to an example embodiment of this invention.

For purposes of illustrating what a VIG unit is like after activation of an EG type getter 32, FIG. 16 illustrates the VIG window unit of the FIG. 7 embodiment after activating/flashing of the getter 32. FIG. 16 illustrates that, after activating/flashing the EG getter 32, the evaporated and deposited EG material 32b' from the getter 32 is present on both the opposing substrate 3 proximate the original getter recess 14 and possibly on sidewall(s) at 15 of the original getter recess 14. It can be seen that in embodiments where additional recess 14' is provided on the opposing substrate 3, the EG material 32b' following activation may be deposited on surfaces of the recess 14' and/or on the major interior surface 3a of substrate 3 proximate the original getter recess 14. It is also possible that activated EG material 32b' may end up deposited on part of the major interior surface 2a of the substrate 2 proximate the original getter recess 14. Thus, it will be appreciated that prior to activating, an EG getter 32 is located on substrate 2 in recess 14, whereas after activating evaporated and deposited getter material 32b' from the EG material may be located (i) on the second substrate 3 at least in an area substantially opposite the recess 14 defined in the first substrate 2, and/or (ii) on sidewall(s) of recess 14. FIG. 16 (compared to FIG. 7) shows how EG getter material evaporates and moves during activation; and when EG getter material is used in other embodiments of this invention the evaporated material moves in a similar manner so as to end up deposited on at least the opposing substrate 3 after activation/flashing. Still referring to FIG. 16, while not illustrated, evaporated and deposited getter material 32b' from an EG originally located in getter container 38 may also end up, following activation, in and/or on portions of the container 38.

In certain example embodiments of this invention, there is provided a vacuum insulated glass (VIG) window unit comprising: first and second substantially parallel substrates comprising glass (one or both of the substrates may also include a coating such as a low-E coating on the glass), a plurality of spacers and a seal provided between the first and second substrates, a space, defined at least by the seal, located between the first and second substrates and being at a pressure less than atmospheric pressure, getter material from an evaporable getter being located in and/or proximate a getter recess that is defined in one of the substrates, and wherein said getter recess is shaped and/or designed so that more getter material surface area is provided compared to if the getter recess was cylindrical in shape with a flat bottom surface.

In the VIG window unit of the immediately preceding paragraph, the getter recess defined in one of the substrates may include a bottom surface and at least one sidewall that is at least partially angled relative to the vertical.

In the VIG window unit of any of the preceding two paragraphs, the getter recess defined in one of the substrates may include a roughened bottom surface, the roughened bottom surface being rougher than is a major interior surface of the substrate in which the getter recess is defined.

In the VIG window unit of any of the preceding three paragraphs, a roughened bottom surface of the getter recess may be etched.

In the VIG window unit of any of the preceding four paragraphs, the getter recess defined in one of the substrates may have at least one sidewall having a rounded and/or chamfered upper portion where the getter recess interfaces with a major interior surface of the substrate in which the getter recess is defined.

In the VIG window unit of any of the preceding five paragraphs, the getter recess defined in one of the substrates may have a roughened bottom surface and at least one sidewall that is/are not roughened.

In the VIG window unit of any of the preceding six paragraphs, the getter recess defined in one of the substrates may comprise a bottom surface and at least one sidewall located between the bottom surface and a major interior surface of the substrate in which the getter recess is defined, wherein the sidewall is roughened compared to the major interior surface of the substrate.

In the VIG window unit of any of the preceding seven paragraphs, the getter recess defined in one of the substrates may comprise a bottom surface and at least one sidewall located between the bottom surface and a major interior surface of the substrate in which the getter recess is defined, wherein the bottom surface is roughened compared to the major interior surface of the substrate.

In the VIG window unit of any of the preceding eight paragraphs, a bottom surface of the getter recess may be roughened via a coating with a rough upper surface that is provided at the bottom of the getter recess under getter material.

In the VIG window unit of any of the preceding nine paragraphs, a sidewall of the recess may be angled relative to the vertical.

In the VIG window unit of any of the preceding ten paragraphs, at least some of the getter material may be located within a getter container that has a container sidewall and is provided in the getter recess, wherein the getter container includes at least one open side and/or end where the container sidewall is not present or is reduced in size as viewed from above. In certain example embodiments, the open side and/or end of the getter container does not face toward a most closely adjacent portion of the edge seal.

In certain example embodiments of this invention, there is provided a vacuum insulated glass (VIG) window unit comprising: first and second substantially parallel substrates comprising glass, a plurality of spacers and a seal provided between the first and second substrates, a space, defined at least by the seal, that is provided between the first and second substrates and is at a pressure less than atmospheric pressure, getter material from an evaporable getter being located in and/or proximate a getter recess that is defined in the first substrate, and wherein said getter recess and/or a getter container in said getter recess is/are shaped to increase evaporated getter material surface area.

In the VIG window unit of the immediately preceding paragraph, the getter container may comprise a substantially vertical container sidewall and may be provided in the getter recess, wherein the getter container includes at least one open side and/or end where the substantially vertical container sidewall is not present or is reduced in size as viewed from above.

In the VIG window unit of any of the preceding two paragraphs, the open side and/or end of the getter container may not face toward a most closely adjacent portion of an edge seal.

In the VIG window unit of any of the preceding three paragraphs, the getter material may comprise barium.

In the VIG window unit of any of the preceding four paragraphs, the VIG window unit may have a visible transmission of at least about 50%.

In the VIG window unit of any of the preceding five paragraphs, the getter recess defined in the first substrate may comprise a bottom surface and at least one sidewall located between the bottom surface and a major interior surface of the first substrate, wherein the bottom surface of the getter recess is roughened compared to the major interior surface of the first substrate.

In certain example embodiments of this invention, there is provided a vacuum insulated glass (VIG) window unit comprising: first and second substantially parallel substrates of or including glass, an array of spacers and a seal provided between the first and second substrates, a space, defined at least by the seal, located between the first and second substrates and being at a pressure less than atmospheric pressure, a getter recess defined in the first substrate for receiving an originally positioned getter, and a getter structure on the second substrate, located substantially opposite the getter recess in the first substrate, designed so that more getter material surface area is provided on the second substrate after getter activation.

In the VIG window unit of the immediately preceding paragraph, the getter structure on the second substrate may comprise a recess 14' defined in the second substrate (e.g., see FIGS. 5, 7-8, 10-11 and 13-15). The recess defined in the second substrate may (i) comprise a roughened surface that is rougher than is a major interior surface of the second substrate, and/or (ii) comprise a bottom surface and at least one sidewall that is at least partially angled relative to the vertical. A pump-out tube may be located directly over and/or in the recess defined in the second substrate (e.g., see FIGS. 10-11 and 15).

In the VIG window unit of any of the immediately preceding two paragraphs, the getter structure on the second substrate may comprise a rough and/or porous coating 36 on the second substrate in a location opposite the getter recess 14 defined in the first substrate (e.g., see FIGS. 6, 8, 11, 14-15). The coating may be located in a recess defined in the second substrate in a location opposite the getter recess defined in the first substrate.

In the VIG window unit of any of the preceding three paragraphs, the getter material may comprise barium.

In the VIG window unit of any of the preceding four paragraphs, the VIG window unit may have a visible transmission of at least about 50%.

In certain example embodiments of this invention, there is provided a vacuum insulated glass (VIG) window unit comprising: first and second substantially parallel substrates, a plurality of spacers and a seal provided between the first and second substrates, a space, defined at least by the seal, located between the first and second substrates and being at a pressure less than atmospheric pressure, a first getter recess defined in the first substrate for receiving an originally positioned evaporable getter (EG), a second getter recess defined in the second substrate in a position substantially opposite the first getter recess so that at least a portion of the first getter recess in the first substrate overlaps with at least a portion of the second getter recess in the second substrate, and wherein evaporated and deposited getter material, from the EG, is located in both the first getter recess and the second getter recess.

In the VIG window unit of the immediately preceding paragraph, the second getter recess defined in the second substrate may comprise a roughened surface that is rougher (e.g., due to etching, sandblasting, a rough/porous coating, or the like) than is a major interior surface of the second substrate.

In the VIG window unit of any of the immediately preceding two paragraphs, a sidewall of the first and/or second recess may be at least partially angled relative to the vertical.

In the VIG window unit of any of the immediately preceding three paragraphs, a pump-out tube may be located directly over and/or in the second recess defined in the second substrate.

In the VIG window unit of any of the immediately preceding four paragraphs, the evaporated and deposited getter material may be of or include barium.

In the VIG window unit of any of the immediately preceding five paragraphs, the first and second substrates may comprise glass that has been thermally tempered.

In the VIG window unit of any of the immediately preceding six paragraphs, the first recess defined in the first substrate may have a depth of from about 1.5 to 2.5 mm.

In the VIG window unit of any of the immediately preceding seven paragraphs, the second recess may have a depth of from about 1.5 to 2.5 mm.

While certain example embodiments have been described and disclosed herein, it will be understood that the embodiments described herein are intended to be illustrative, not limiting, and that those skilled in the art will understand that various modifications may be made without departing from the true spirit and full scope of the claims appended hereto.

What is claimed is:

1. A vacuum insulated glass (VIG) window unit comprising:
    first and second substantially parallel substrates comprising glass,
    a plurality of spacers and a seal provided between the first and second substrates,
    a space, defined at least by the seal, located between the first and second substrates and being at a pressure less than atmospheric pressure,
    a getter recess defined in the first substrate for receiving an originally positioned getter,
    a getter structure on the second substrate, located substantially opposite the getter recess in the first substrate, said getter structure on the second substrate designed to increase getter material surface area provided on the second substrate after getter activation, wherein the getter structure on the second substrate comprises one or more of: (i) a recess having a base and at least one sidewall defined in the second substrate, (ii) a rough surface area where the second substrate has been roughened where the rough surface area is more rough than is a major interior surface of the second substrate which faces the space, and/or (iii) a rough and/or porous coating; and
    wherein the getter recess defined in the first substrate for receiving the originally positioned getter comprises a roughened sidewall that is roughened irrespective of getter material, so that the sidewall is roughened prior to activation of the getter.

2. The VIG window unit of claim 1, wherein the getter structure on the second substrate comprises a recess defined in the second substrate, the recess having a base and at least one sidewall that extends between the base and a major interior surface of the second substrate.

3. The VIG window unit of claim 2, wherein the recess defined in the second substrate comprises a roughened surface that is rougher than is a major interior surface of the second substrate.

4. The VIG window unit of claim 2, wherein the sidewall of the recess defined in the second substrate is at least partially angled relative to the vertical.

5. The VIG window unit of claim 2, wherein a pump-out tube is located directly over and/or in the recess defined in the second substrate.

6. The VIG window unit of claim 1, wherein the getter structure on the second substrate comprises a rough and/or porous coating on the second substrate in a location opposite the getter recess defined in the first substrate, wherein the rough and/or porous coating is irrespective of getter material so that the rough and/or porous coating is provided prior to activation of the getter.

7. The VIG window unit of claim 1, wherein the getter structure on the second substrate comprises a rough and/or porous coating in a recess defined in the second substrate in a location opposite the getter recess defined in the first substrate, wherein the rough and/or porous coating is irrespective of getter material so that the rough and/or porous coating is provided prior to activation of the getter.

8. The VIG window unit of claim 1, wherein the getter material comprises barium.

9. The VIG window unit of claim 1, wherein the VIG window unit has a visible transmission of at least about 50%.

10. The VIG window unit of claim 1, wherein the getter comprises EG getter material.

11. A vacuum insulated glass (VIG) window unit comprising:
    first and second substantially parallel substrates comprising glass,
    a plurality of spacers and a seal provided between the first and second substrates,
    a space, defined at least by the seal, located between the first and second substrates and being at a pressure less than atmospheric pressure,
    getter material from an evaporable getter being located in and/or proximate a getter recess that is defined in the first substrate, and
    wherein said getter recess comprises a roughened sidewall that is roughened irrespective of getter material, in order to increase getter material surface area, so that the sidewall is roughened prior to activation of the getter and getter material from the evaporable getter is located over the roughened sidewall.

12. The VIG window unit of claim 11, wherein the getter recess includes a bottom surface and at least one sidewall that is at least partially angled relative to the vertical.

13. The VIG window unit of claim 11, wherein the roughened sidewall of the getter recess is rougher than is a major interior surface of the first substrate in which the getter recess is defined.

14. The VIG window unit of claim 11, wherein the roughened sidewall of the getter recess is etched.

15. The VIG window unit of claim 11, wherein the getter recess has at least one sidewall having a rounded and/or chamfered upper portion where the getter recess interfaces with a major interior surface of the first substrate.

16. The VIG window unit of claim 11, wherein at least some of the getter material is located within a getter container that comprises a container sidewall and is provided in the getter recess.

17. The VIG window unit of claim 16, wherein the getter container includes at least one open side and/or end where the container sidewall is not present or is reduced in size as viewed from above.

18. The VIG window unit of claim 11, wherein said roughened sidewall of the getter recess is roughened via a rough coating, said coating being rougher than is a major interior surface of the first substrate.

19. A vacuum insulated glass (VIG) window unit comprising:
   first and second substantially parallel substrates comprising glass,
   an array of spacers and a seal provided between the first and second substrates,
   a space, defined at least by the seal, that is provided between the first and second substrates and is at a pressure less than atmospheric pressure,
   getter material from an evaporable getter being located in and/or proximate a getter recess that is defined in at least one of the substrates, and
   wherein said getter recess comprises a rough coating provided therein so as to be located between the getter material and the one substrate.

20. The VIG window unit of claim 19, wherein the getter material comprises barium.

21. A vacuum insulated glass (VIG) window unit comprising:
   first and second substantially parallel substrates,
   a plurality of spacers and a seal provided between the first and second substrates,
   a space, defined at least by the seal, located between the first and second substrates and being at a pressure less than atmospheric pressure,
   a first getter recess defined in the first substrate for receiving an originally positioned evaporable getter (EG),
   a second getter recess defined in the second substrate in a position substantially opposite the first getter recess so that at least a portion of the first getter recess in the first substrate overlaps with at least a portion of the second getter recess in the second substrate,
   wherein evaporated and deposited getter material, from the EG, is located in both the first getter recess and the second getter recess; and
   wherein a rough coating is provided in the second getter recess so as to be located between the deposited getter material and the second substrate.

22. The VIG window unit of claim 21, wherein the getter recess defined in the first substrate for receiving the originally positioned getter comprises a roughened sidewall that is roughened irrespective of getter material, so that the sidewall is roughened prior to activation of the getter.

23. The VIG window unit of claim 21, wherein a sidewall of the first and/or second recess is at least partially angled relative to the vertical.

24. The VIG window unit of claim 21, wherein a pump-out tube is located directly over and/or in the second recess defined in the second substrate.

25. The VIG window unit of claim 21, wherein the evaporated and deposited getter material comprises barium.

26. The vacuum insulated glass (VIG) window unit of claim 21, wherein the first and second substrates comprise thermally tempered glass.

27. The vacuum insulated glass (VIG) window unit of claim 21, wherein at least one of the first recess and the second recess has a depth of from about 1.5 to 2.5 mm.

* * * * *